(12) United States Patent
Nakamura et al.

(10) Patent No.: US 7,354,338 B2
(45) Date of Patent: Apr. 8, 2008

(54) METHOD AND APPARATUS FOR TRANSFERRING A STICK WITH A FOOD PRODUCT SUCH AS A SAUSAGE SUSPENDED THEREFROM

(75) Inventors: Tatsuo Nakamura, Kanagawa (JP); Katsuya Tanabe, Kanagawa (JP); Takayuki Fujimaki, Kanagawa (JP)

(73) Assignee: Hitec Co., Ltd., Kanagawa (JP)

( * ) Notice: Subject to any disclaimer, the term of this patent is extended or adjusted under 35 U.S.C. 154(b) by 183 days.

(21) Appl. No.: 11/000,919

(22) Filed: Dec. 2, 2004

(65) Prior Publication Data
US 2005/0239386 A1 Oct. 27, 2005

(30) Foreign Application Priority Data
Apr. 23, 2004 (JP) ............................. 2004-128811
Apr. 28, 2004 (JP) ............................. 2004-134909

(51) Int. Cl.
*A22C 11/00* (2006.01)
(52) U.S. Cl. ..................................... 452/30
(58) Field of Classification Search ............ 452/30–32, 452/35, 46, 51
See application file for complete search history.

(56) References Cited

U.S. PATENT DOCUMENTS

| | | | | |
|---|---|---|---|---|
| 6,869,353 B2* | 3/2005 | Kasai | ........................ | 452/186 |
| 7,000,816 B1* | 2/2006 | Mikelsons et al. | ............. | 226/2 |
| 7,121,940 B2* | 10/2006 | Haschke et al. | .............. | 452/51 |
| 7,166,021 B2* | 1/2007 | Stimpfl | ........................ | 452/32 |

FOREIGN PATENT DOCUMENTS

| | | |
|---|---|---|
| JP | 1-22474 | 7/1989 |
| JP | 6-21351 | 6/1994 |
| JP | 7-23693 | 1/1995 |
| JP | 8-266216 | 10/1996 |
| JP | 2003-158991 | 6/2003 |
| JP | 2003-180239 | 7/2003 |

OTHER PUBLICATIONS

Dutch Search Report May 15, 2006.

* cited by examiner

*Primary Examiner*—Thomas Price
(74) *Attorney, Agent, or Firm*—Takeuchi & Kubotera, LLP

(57) ABSTRACT

An apparatus for transferring a stick with a food product such as a sausage suspended therefrom includes: a stick supplying device for transferring onto a stick a sausage suspended from a loop forming device and for subsequently supplying the stick with the sausage suspended therefrom to a stick supporting and relaying device; the stick supporting and relaying device for temporarily placing thereon and supporting the stick; the transferring device for transferring the stick from the stick supporting and relaying device to a conveying device; the conveying device for conveying the stick to a stick delivering device; the stick delivering device for sequentially delivering to a swiveling device each leading one of a plurality of sticks which have been conveyed in parallel by the conveying device; the swiveling device for swiveling the stick about a swiveling axis; and a stick taking-off device for sequentially taking off the stick from the swiveling device.

7 Claims, 32 Drawing Sheets

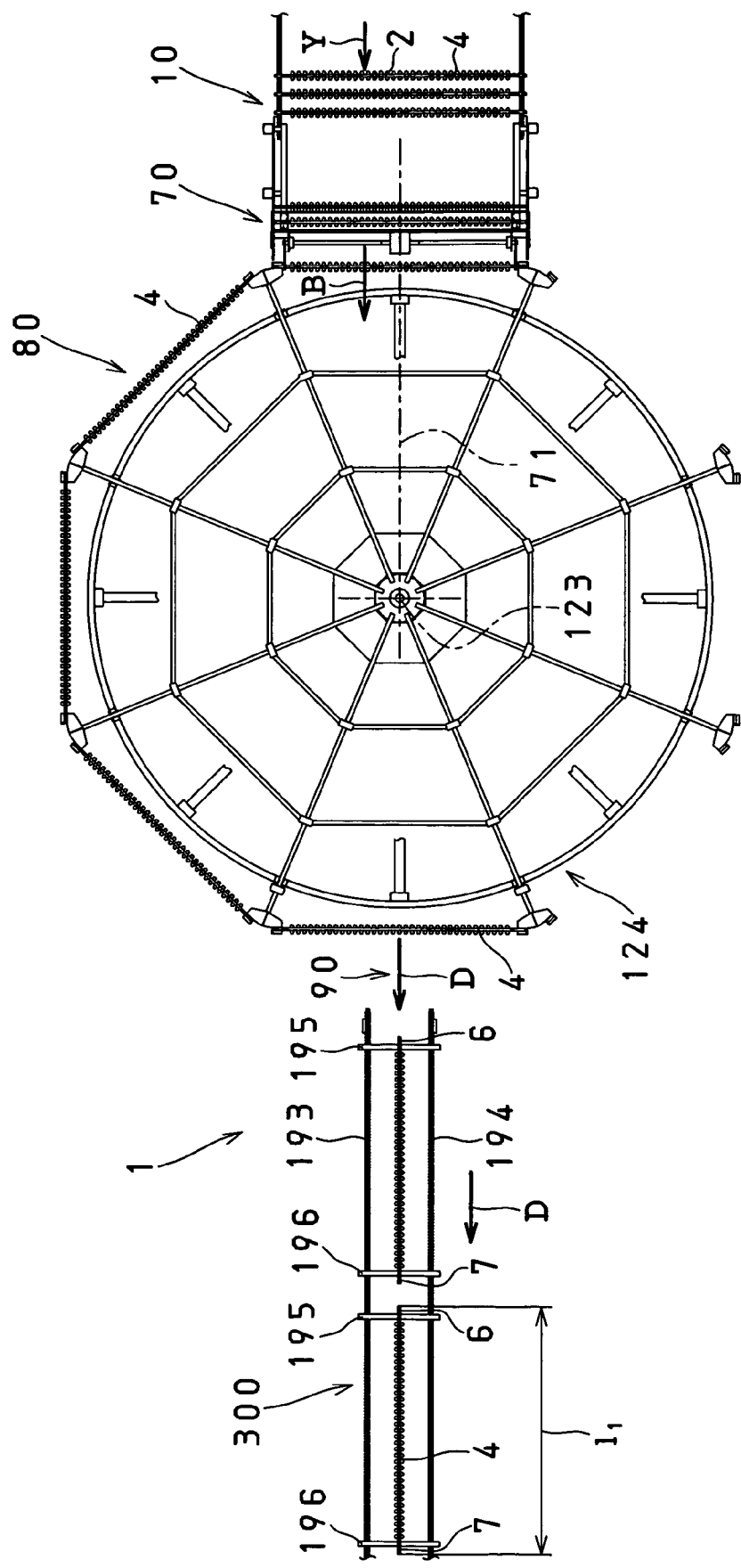

METHOD AND APPARATUS FOR TRANSFERRING A STICK WITH A FOOD PRODUCT SUCH AS A SAUSAGE SUSPENDED THEREFROM

BACKGROUND OF THE INVENTION

1. Field of the Invention

The present invention relates to a method and an apparatus for transferring a stick with a food product such as a sausage suspended therefrom.

2. Description of the Related Art

In general, the sausage is manufactured by stuffing a natural casing or an artificial casing with a meat emulsion or the like, by suspending from a stick a linked casing with the meat emulsion stuffed therein, and by cooking the sausage suspended from the stick in a smokehouse.

In the manufacture of such a sausage, the stick with the sausage suspended therefrom is normally conveyed to the place of a cooking process through a conveying apparatus and a smoking truck. To transfer such a stick onto the conveying apparatus, there have been proposed a transfer apparatus in which one end of the stick is clamped and held to move the stick horizontally, as disclosed in JP-UM-B-6-21351, as well as an apparatus in which two portions of the stick are restrained and held and the stick is moved in a horizontal direction and in a vertical direction, as disclosed in JP-A-2003-180239.

Furthermore, the sausage is normally inspected and corrected in a state in which it is suspended from the stick. As shown in FIGS. 35A and 35B, such sticks 4 each having the sausage 2 suspended therefrom are normally conveyed in a direction Y by a conveying means 10 in a state in which the sticks 4 with the respective sausages 2 suspended therefrom are accumulated in mutually parallel rows. The sticks 4 with the respective sausages 2 suspended therefrom are sequentially transferred from the conveying means 10 onto a smoking truck 98 in front of a smokehouse, are accumulated in multiple stages, and are sent to the smokehouse.

In the transfer apparatus disclosed in JP-UM-B-6-21351, a clamping member for clamping one end of a stick reciprocates between a carrying-in position at which one end of the stick is clamped and a conveyor supplying position. In a case where a plurality of clamping members and lowering means are provided for one conveyor, since it is necessary to supply the sticks to conveyor portions where the sticks are not placed, the waiting time until the lowering of the clamping members is prolonged, so that the return of the clamping member to the carrying-in position is delayed correspondingly. There is a problem in that while the clamping member is not returned to the carrying-in position, an ensuing stick cannot be set on the clamping member, so that productivity declines.

In addition, since the stick is supported in a cantilevered manner to move the stick horizontally by clamping and holding one end of the stick with the sausage suspended therefrom, deflection is likely to occur in the stick, and deformation of the stick occurs due to the deflection of the stick. Moreover, there is a problem in that since the stick is supported in the cantilevered manner, if insufficiency occurs in the clamping force, the dropping of the stick results.

Furthermore, the transfer apparatus disclosed in JP-UM-B-6-21351 does not transfer an automatically supplied stick to the conveying apparatus, but transfers a manually supplied stick to the conveying apparatus. Therefore, this transfer apparatus is not suitable for labor saving.

In the transfer apparatus disclosed in JP-A-2003-180239, since the movement of the stick for delivering the sausage from hooks onto the stick and the movement of the stick with the sausage suspended therefrom to a stick placing table are effected by the same fixed hand section 41, two horizontally rotating arms are required so as not to lower productivity. In addition, since the two horizontally rotating arms are rotated, a large space is required for the movement of the stick. Furthermore, in this transfer apparatus, the other end portion of the stick, which is not restrained and held and is not positionally restricted, is inserted into loops which are suspended from the hooks and swing, so that there is a need to enlarge the loops. For this reason, the hooks are provided with mechanisms for enlarging the loops.

Furthermore, since the sticks 4 with the respective sausages 2 suspended therefrom are accumulated on both the conveying means 10 and the smoking truck 98, there is a problem in that it is difficult to perform the operation of inspecting and correcting the sausage 2.

SUMMARY OF THE INVENTION

The present invention has been devised in view of the above-described aspects, and its object is to provide a method and an apparatus for transferring a stick with a food product such as a sausage suspended therefrom, which make it possible to improve productivity by enhancing the rate of operation of the apparatus with a simple structure, which do not require a large space for the transfer of the stick, which can make the transfer speed high and have no possibility of the stick dropping even if the transfer speed is made high, and which are suitable for automation and labor saving.

Another object of the invention is to provide a method and an apparatus for transferring a stick with a food product such as a sausage suspended therefrom, which make it possible to automatically effect the operation ranging from the suspension of the food product such as the sausage or the like from the stick to the delivery of the stick to a conveying means without requiring a large space, and which make it possible to improve productivity by enhancing the rate of operation of the apparatus, as well as an apparatus therefor having a simple structure.

Still another object of the invention is to provide a method and an apparatus for transferring a stick with a food product such as a sausage suspended therefrom, which make it possible to facilitate the operation of inspecting and correcting the food product such as the sausage.

A further object of the invention is to provide a method and an apparatus for transferring a stick with a food product such as a sausage suspended therefrom, which make it possible to take off at a desired position the stick with the inspected and corrected food product such as the sausage suspended therefrom.

A still further object of the invention is to provide a method and an apparatus for transferring a stick with a food product such as a sausage suspended therefrom, which make it possible to take off the stick by adjusting the number of the sticks each having the food product such as the sausage suspended therefrom.

A further object of the invention is to provide a method and an apparatus for transferring a stick with a food product such as a sausage suspended therefrom, which make it possible to automatically effect the delivery and the taking off of the stick with the food product such as the sausage suspended therefrom.

In accordance with one aspect of the invention, there is provided a method for transferring a stick with a food product such as a sausage suspended therefrom, comprising the steps of: removing and supporting a stick at both end portions thereof, the stick being supported in advance at the both end portions, the sausage or the like being suspended therefrom; transferring the stick supported at the both end portions onto a conveying path for conveying the stick in a direction substantially perpendicular to a longitudinal axis of the stick extending when the stick was supported in advance at the both end portions, while maintaining a direction substantially parallel to the longitudinal axis of the stick; and releasing the support at the both end portions of the stick transferred onto the conveying path.

In accordance with another aspect of the invention, there is provided a method for transferring a stick with a food product such as a sausage suspended therefrom, comprising the steps of: raising toward stick supporting and relaying means stick supplying means for supporting both end portions of a stick disposed in loops of the sausage or the like suspended in loop form from a plurality of suspending hooks, and abutting the stick against the loops of the sausage or the like, thereby disengaging the loops from the suspending hooks and transferring the loops onto the stick; supplying the stick with the loops of the sausage or the like suspended therefrom from the stick supplying means to the stick supporting and relaying means, and supporting the both end portions of the stick by the stick supporting and relaying means; and causing stick removing and supporting means which removed the stick from the stick supporting and relaying means and supported the both end portions of the stick to move linearly in a substantially horizontal plane in a direction of a longitudinal axis of the supported stick, and transferring the stick with the sausage or the like suspended therefrom to conveying means for conveying the stick in a direction substantially perpendicular to the longitudinal axis of the supported stick.

In accordance with still another aspect of the invention, there is provided an apparatus for transferring a stick with a food product such as a sausage suspended therefrom, comprising: a pair of stick removing and supporting means for removing from stick supporting and relaying means a stick which is supported at both end portions thereof by the stick supporting and relaying means and from which the sausage or the like is suspended, and for supporting the stick at the both end portions; and transferring means for transferring the stick which is supported at the both end portions by the stick removing and supporting means onto conveying means for conveying the stick in a direction substantially perpendicular to a longitudinal axis of the stick extending when the stick was supported at the both end portions by the stick supporting and relaying means, while maintaining a direction substantially parallel to the longitudinal axis of the stick.

In accordance with a further aspect of the invention, there is provided an apparatus for transferring a stick with a food product such as a sausage suspended therefrom, comprising: loop forming means for suspending a sausage or the like in loop form from suspending hooks and conveying the sausage or the like; stick supporting and relaying means having a pair of stick receivers for supporting both end portions of the stick with the sausage or the like suspended therefrom; stick supplying means for being raised while supporting the both end portions of the stick disposed in loops of the sausage or the like suspended in loop form from a plurality of suspending hooks, and for supplying to the stick receivers the stick from which the loops of the sausage or the like disengaged from the suspending hooks are suspended; stick removing and supporting means having a pair of movable members for removing and supporting the both end portions of the stick being supported by the stick receivers, and movable member actuating means for causing the movable members to remove the stick being supported by the stick receivers; and transferring means for transferring the stick with the sausage or the like suspended therefrom to conveying means for conveying the stick in a direction substantially perpendicular to a longitudinal axis of the supported stick, by moving the stick removing and supporting means supporting the both end portions of the stick linearly in a substantially horizontal plane in a direction of the longitudinal axis of the supported stick.

The movable members suffice if they are adapted to undergo rotary motion or linear motion. As the movable members disposed at positions below the stick move upward toward the end portions of the stick to place the stick thereon, or as the opposing movable members disposed at positions above the stick clamp the end portions of the stick, the stick can be removed from the stick receivers and can be supported. It is possible to adopt various other forms for the movable members.

In accordance with a still further aspect of the invention, there is provided a method for transferring a stick with a food product such as a sausage suspended therefrom, comprising the steps of: sequentially separating each leading one of a plurality of sticks from each of which a food product such as a sausage is suspended and which have been moved in parallel; and moving the separated stick along a stick moving path which extends from the separated stick toward a swiveling axis in a direction substantially perpendicular to a longitudinal axis of the separated stick; and causing the separated stick which has been moved along the stick moving path to swivel by a predetermined angle about the swiveling axis located on the stick moving path.

In accordance with a further aspect of the invention, there is provided an apparatus for transferring a stick with a food product such as a sausage suspended therefrom, comprising: swiveling means including a plurality of pairs of stick supporting members, each of the plurality of pairs of stick supporting members being adapted to receive a leading one of a plurality of sticks from each of which a food product such as a sausage is suspended and which have been moved in parallel, and for supporting the leading stick at both ends thereof, the leading stick having been separated from a following set of the plurality of sticks and having been moved along a stick moving path, the swiveling means further including a swiveling axis located on the stick moving path which passes through the stick, which is supported on the pair of stick supporting members, in a direction substantially perpendicular to a longitudinal axis of the supported stick, and a swivel body on which the plurality of pairs of stick supporting members for supporting the each of the plurality of sticks at the both end portions thereof are provided about the swiveling axis, and which swivels about the swiveling axis.

According to the transferring method and apparatus in accordance with the above-described aspects, the food product such as the sausage suspended from the respective sticks can be monitored individually through this swiveling. In consequence, it becomes possible to easily perform the inspection and correction operation of the food product such as the sausage. In addition, through the swiveling it is possible to take off at a desired position the stick with the inspected and corrected food product such as the sausage suspended therefrom. Moreover, since the sticks can be easily removed from the swiveling means and stored, as required, through the swiveling, it is possible to take off the sticks after adjusting the number of the sticks midway in the swiveling. Furthermore, it is possible to automatically effect the delivery and the taking off of the sticks.

In accordance with a still further aspect of the invention, there is provided an apparatus for transferring a stick with a food product such as a sausage suspended therefrom, comprising: swiveling means including a swiveling axis, a pair of stick supporting members for supporting a stick with a food product such as a sausage suspended therefrom, the pair of stick supporting members being disposed at positions spaced apart a swivel radius from the swiveling axis, and a swivel body on which a plurality of the pairs of stick supporting members are provided about the swiveling axis so as to be capable of arranging a plurality of sticks in a polygonal shape.

In accordance with the present invention, it is possible to provide a method and an apparatus for transferring a stick with a food product such as a sausage suspended therefrom, which make it possible to improve productivity by enhancing the rate of operation of the apparatus with a simple structure, which do not require a large space for the transfer of the stick, which can make the transfer speed high and have no possibility of the sausage or the stick dropping even if the transfer speed is made high, and which are suitable for automation and labor saving.

In accordance with the present invention, it is possible to provide a method for transferring a stick with a food product such as a sausage suspended therefrom, which makes it possible to automatically effect the operation ranging from the suspension of the sausage or the like from the stick to the delivery of the stick to a conveying means without requiring a large space in the transfer of the stick, and which makes it possible to improve productivity by enhancing the rate of operation of the apparatus, as well as an apparatus therefore having a simple structure.

In accordance with the invention, it is possible to provide a method and an apparatus for transferring a stick with a food product such as a sausage suspended therefrom, which make it possible to facilitate the operation of inspecting and correcting the food product such as the sausage, make it possible to take off at a desired position the stick with the inspected and corrected food product such as the sausage suspended therefrom, make it possible to take off the stick by adjusting the number of the sticks with the food product such as the sausage suspended therefrom, and make it possible to automatically effect the delivery and the taking off of stick.

Hereafter, a more detailed description will be given of a mode for carrying out the invention on the basis of preferred embodiments illustrated in the drawings. It should be noted that the invention is not limited to such embodiments.

BRIEF DESCRIPTION OF THE DRAWINGS

FIG. 34 is a plan view of a further preferred embodiment of the invention;

DESCRIPTION OF THE PREFERRED EMBODIMENTS

Figure 1:
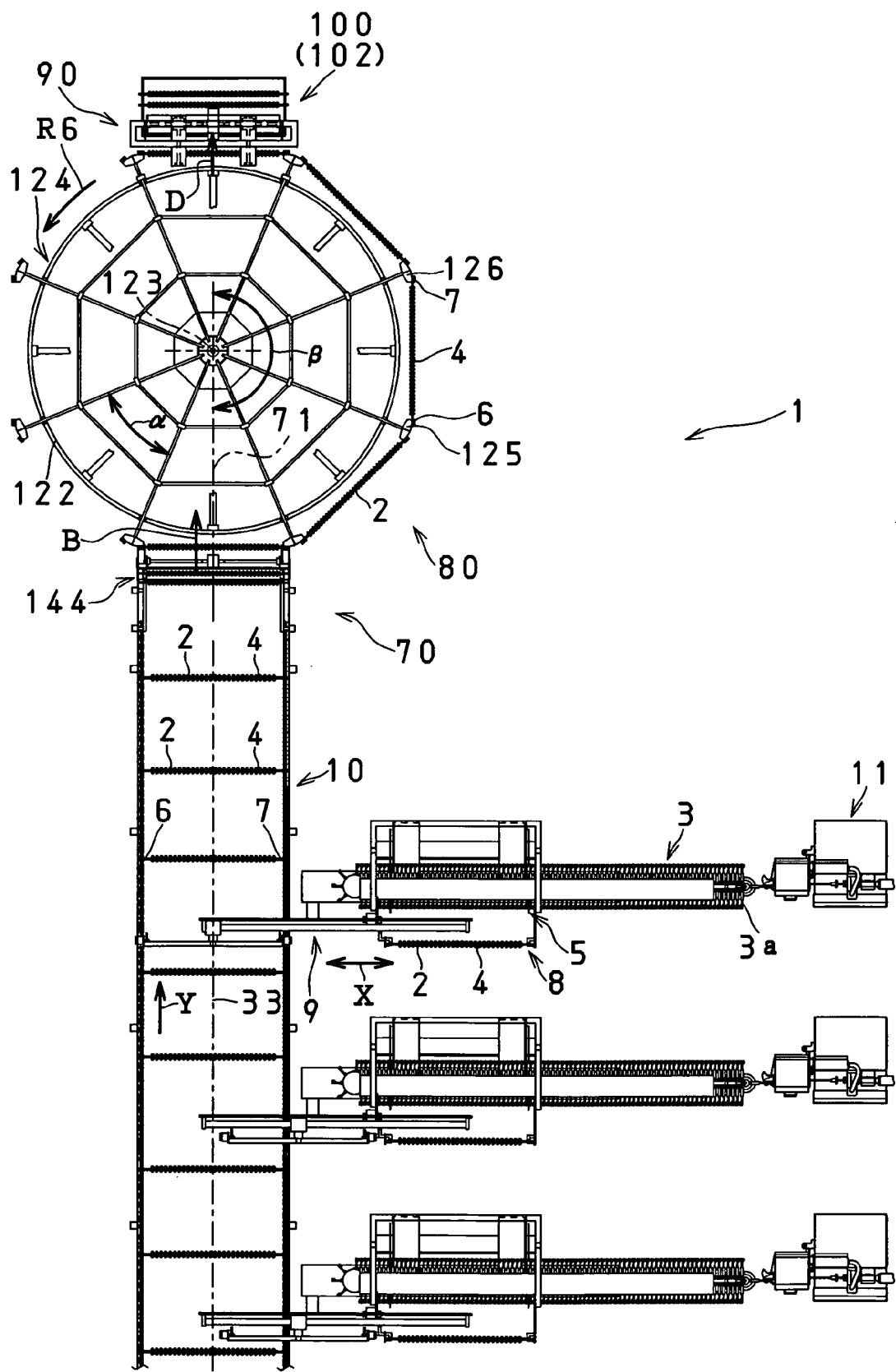
FIG. 1 is a plan view of an apparatus for transferring a stick with a food product such as a sausage suspended therefrom in accordance with a preferred embodiment of the invention.
Figure 2:
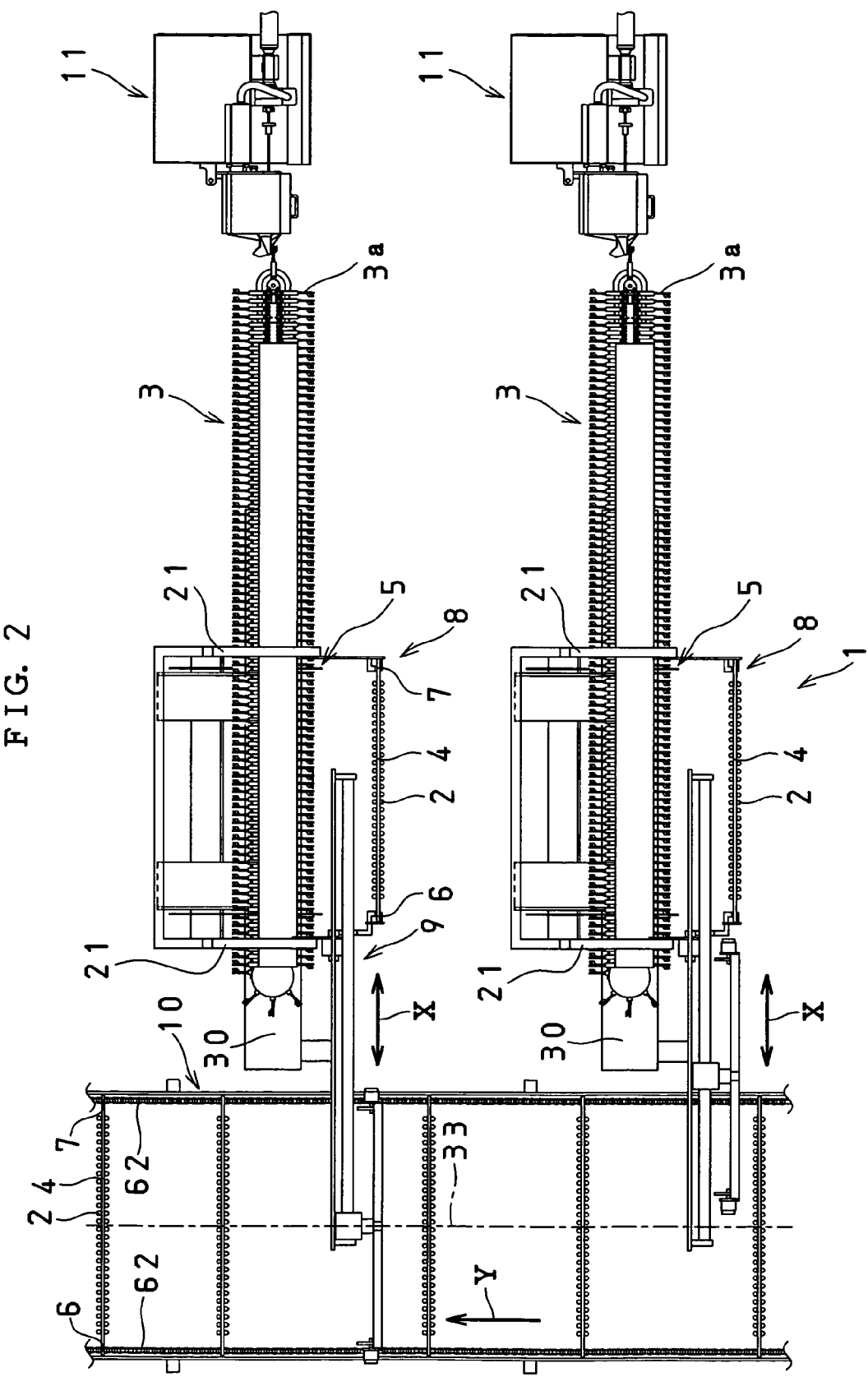
FIG. 2 is a partially enlarged plan view of the embodiment shown in FIG. 1.
Figure 3:
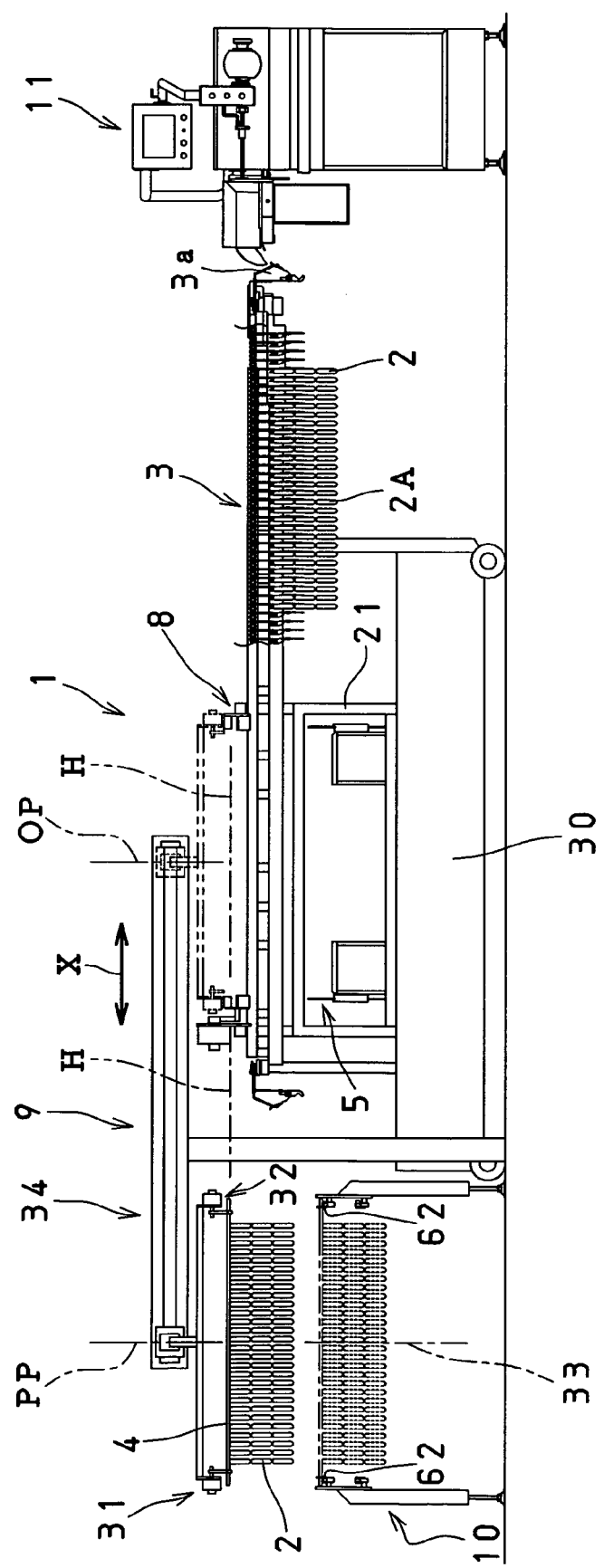
FIG. 3 is a front elevational view of the embodiment shown in FIG. 2.

In FIGS. 1 to 3, reference numeral 1 denotes an apparatus for transferring a stick with a food product such as a sausage suspended therefrom, and reference numeral 11 denotes a stuffing apparatus for manufacturing a linked sausage or the like formed into a chain. The transferring apparatus 1 includes a loop forming means 3 for forming the food product, e.g., the sausage 2, into loops 2A and conveying them; a stick supplying means 5 for transferring onto a stick 4 the sausage 2 suspended from the loop forming means 3 and subsequently supplying the stick 4 with the sausage 2 suspended therefrom to a stick supporting and relaying means 8; the stick supporting and relaying means 8 for temporarily placing thereon and supporting the stick 4 with the sausage 2 suspended therefrom so as to deliver the stick 4 with the sausage 2 suspended therefrom to a transferring means 9; the transferring means 9 for removing the stick 4 from the stick supporting and relaying means 8 and transferring it to a conveying means 10; and the conveying means 10 for conveying the stick 4 in a direction Y substantially perpendicular to a direction X of a longitudinal axis 4A of the stick 4 in which the stick 4 is transferred by the transferring means 9.

The transferring apparatus 1 may be constructed without including the stick supplying means 5. In the apparatus of such a construction, the stick 4 with the sausage 2 suspended therefrom is manually supplied to the stick supporting and relaying means 8.

A plurality of rows of the loop forming means 3, the stick supplying means 5, the stick supporting and relaying means 8, and the transferring means 9 are provided for the conveying means 10. The transferring means 9 in the respective rows are adapted to concurrently effect the transfer of the stick 4 with the sausage 2 suspended therefrom to the conveying means 10. Hereafter, a description will be given of the construction of one row of the loop forming means 3, the stick supplying means 5, the stick supporting and relaying means 8, and the transferring means 9.

Figure 5:
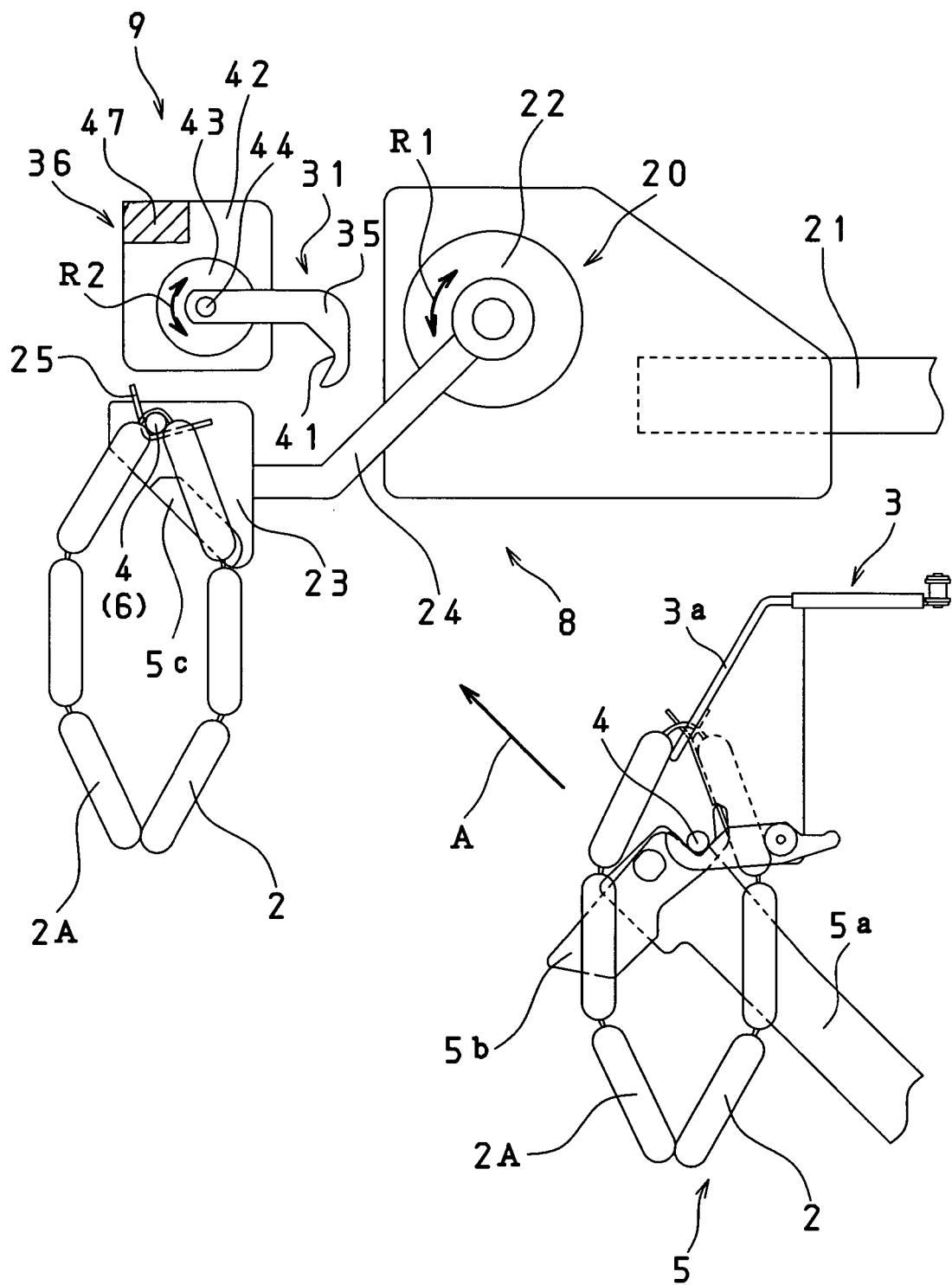
FIG. 5 is a right side elevational view of the embodiment shown in FIG. 4.

Referring also to FIGS. 5 and 6, the loop forming means 3 has a plurality of suspending hooks 3a for suspending the loops of the sausage 2 in which the stick 4 is inserted. The stick supplying means 5 includes a pair of stick supplying and transferring members 5a which are raised toward the stick supporting and relaying means 8, a pair of stick supplying hooks 5b which are respectively provided on the stick supplying and transferring members 5a to support both end portions 6 and 7 of the stick 4, and a pair of stick supplying cams 5c provided on the stick supporting and relaying means 8 and adapted to engage the respective stick supplying hooks 5b.

As the pair of stick supplying and transferring members 5a are raised diagonally upwardly (in the direction of arrow A), the stick supplying hooks 5b abut against the both end portions 6 and 7 and raise the stick 4. The stick 4 being raised abuts against the loops 2A of the sausage 2, and causes the loops 2A to be dislocated from the suspending hooks 3a and to be delivered onto the stick 4. The stick supplying hooks 5b, which started to rotate by engaging the stick supplying cams 5c at positions in the vicinities of raised ends of the stick supplying and transferring members 5a, release the stick 4 with the sausage 2 suspended therefrom onto the stick supporting and relaying means 8, on the basis of the raising of the stick supplying and transferring members 5a. The stick supplying and transferring members 5a then stop at their raised end positions. The stick supporting and relaying means 8 supports the both end portions 6 and 7 of the stick 4.

Since the above-described loop forming means 3 and stick supplying means 5 are described in JP-A-2003-158991, a more detailed description thereof will be omitted. It should be noted that the disclosure of JP-A-2003-158991 cited herein is incorporated herein by reference in its entirety.

The stick supporting and relaying means 8 is provided so that after the stick 4, which has been supplied manually or from the stick supplying means 5, is temporarily placed and supported on the stick supporting and relaying means 8, the transferring means 9 removes the supplied stick 4 from the stick supporting and relaying means 8 without directly removing it from the stick supplying means 5.

The stick supporting and relaying means 8 includes a pair of columns 21; a relay arm rotating means 20, e.g., a known pneumatic rotary actuator 22, which is provided on one of the columns 21; a rotatable relay arm 24 one end of which is secured to an output rotating shaft of the rotary actuator 22, a bracket 23 being secured to the other end thereof; a stick receiver 25 attached to the bracket 23; a bracket 26 secured to the other column 21; and a stick receiver 25 attached to the bracket 26. The relay arm 24 is adapted to be reciprocally rotated in a direction R1 by the actuation of the rotary actuator 22. The both end portions 6 and 7 of the stick 4 are supported by being placed on the stick receivers 25.

The transferring means 9 is provided on a frame 30 and includes a pair of stick removing and supporting means 31 and 32 adapted to remove and support the both end portions 6 and 7 of the stick 4 which is supported at the both end portions 6 and 7 by the stick supporting and relaying means 8; and a moving means 34 for moving the stick removing and supporting means 31 and 32 onto a conveying path 33 of the stick 4 conveyed by the conveying means 10, while maintaining the direction X substantially parallel to a direction X1 in which the longitudinal axis 4A of the stick 4 extended when it was supported by the stick supporting and relaying means 8.

Each of the stick removing and supporting means 31 and 32 has a transfer hook 35 which is reciprocally rotatable in a direction R2, as well as a transfer hook rotating means 36 for rotating the transfer hook 35 in the direction R2.

The pair of transfer hooks 35 have respective removing recessed surfaces 41 for removing the both end portions 6 and 7 and are thereby adapted to support them. The pair of transfer hooks 35 are reciprocally rotatable in the direction R2 in a plane VP which is substantially perpendicular to the direction X, i.e., the direction in which the longitudinal axis 4A of the stick 4 extended when the stick 4 was supported in advance at its both end portions 6 and 7 by the stick supporting and relaying means 8.

Each transfer hook rotating means 36 has a known pneumatic rotary actuator 43 secured to a mounting plate 42. The transfer hook 35 is secured to an output rotating shaft 44 of the rotary actuator 43. The transfer hook 35 is adapted to be reciprocally rotated in the direction R2.

The moving means 34 includes a supporting mechanism 45 for supporting the stick removing and supporting means 31 and 32, as well as a reciprocating means 46 for reciprocating the supporting mechanism 45. The supporting mechanism 45 includes the pair of mounting plates 42; a horizontal rod 47 bridging the mounting plates 42; and a rod member 48 for suspending and supporting the horizontal rod 47.

The reciprocating means 46 includes a horizontally reciprocatingly driving means 50 for moving the rod member 48 in the direction X, and a horizontally movable base 52 to which the rod member 48 is secured. The horizontally reciprocatingly driving means 50 includes a known pneumatic rodless cylinder 51 having a cylinder tube 51A, a body 51B, and a piston 51C which is operatively fastened to the body 51B. The configuration of the horizontally reciprocatingly driving means 50 is not particularly limited. The horizontally reciprocatingly driving means 50 may be constituted by wrapping connector means using a chain or a belt, instead of the rodless cylinder 51.

The pair of stick removing and supporting means 31 and 32 are also adapted to be reciprocated in the direction X by the reciprocating movement in the direction X of the horizontally movable base 52 secured to the body 51B which is adapted to reciprocate in the direction X. Thus, the moving means 34 is adapted to cause the stick removing and supporting means 31 and 32 to move linearly in a substantially horizontal plane H in the direction of the longitudinal axis 4A of the supported stick 4, and to transfer the stick 4 to the conveying means 10.

Figure 6A:
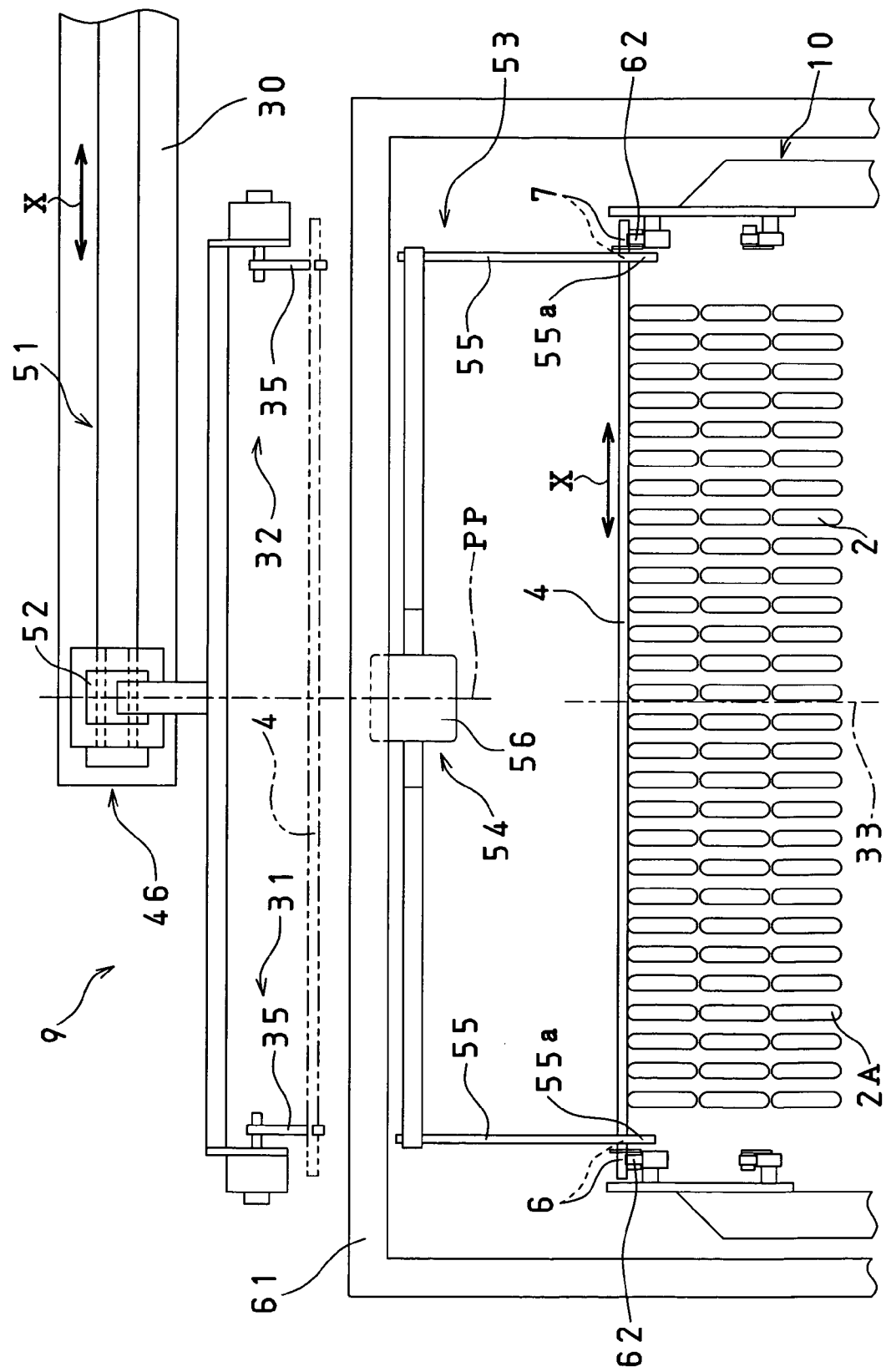
FIG. 6A is a front elevational view of a lowering means used in the embodiment shown in FIG. 2.
Figure 6B:
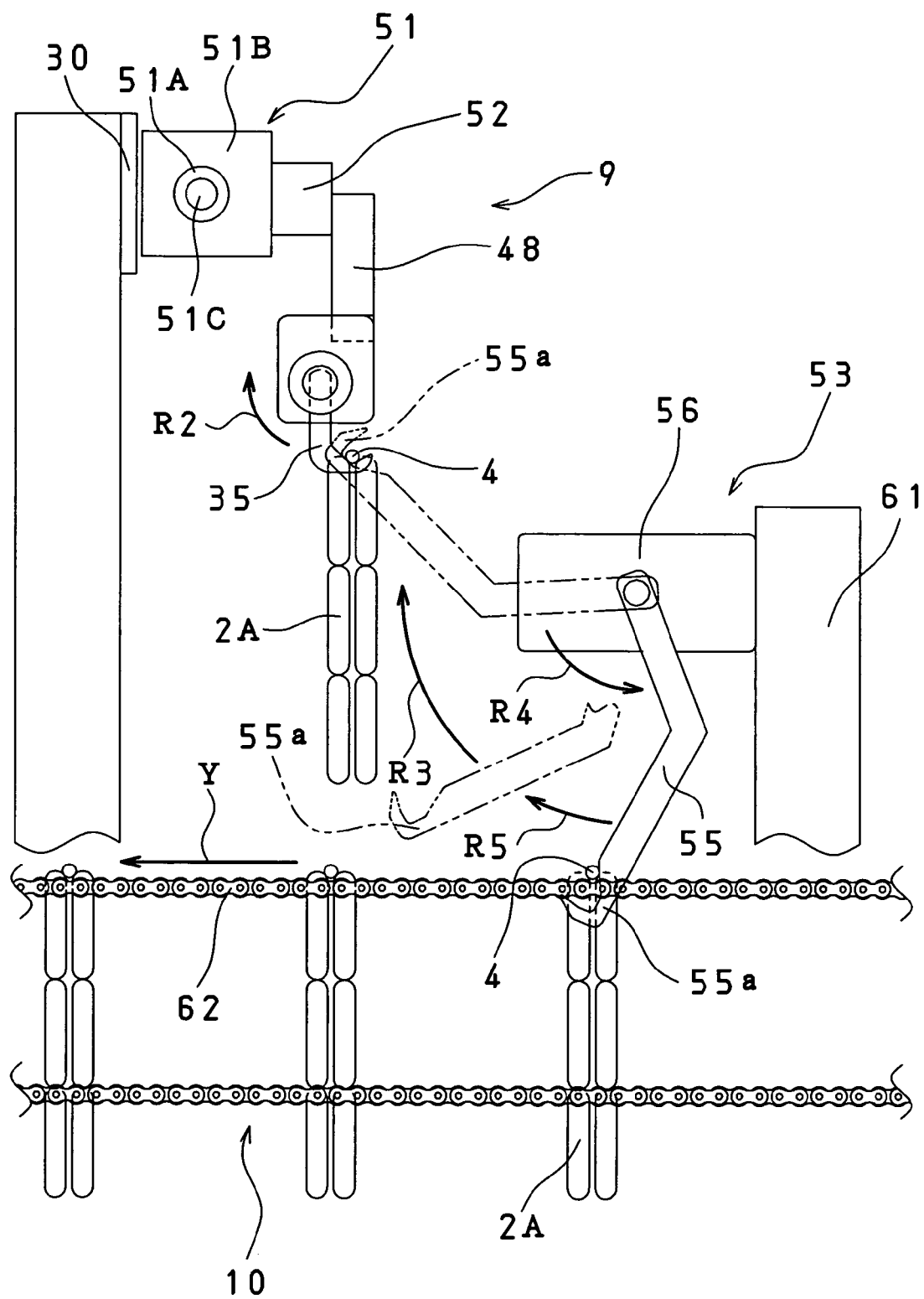
FIG. 6B is a left side elevational view of FIG. 6A and is a diagram explaining the operation.

The transferring means 9 in this embodiment is disposed in close proximity to the conveying means 10 such as the one shown in FIGS. 6A and 6B, and further includes a lowering means 53 for lowering the both end portions 6 and 7 of the stick 4 transferred onto the conveying path 33 extending on the conveying means 10. This lowering means 53 includes a pair of lifting arms 55 each provided with a stick receiving portion 55a located below the transfer hook 35; and a lifting arm rotating means 54, e.g., a known pneumatic rotary actuator 56, for raising or lowering the lifting arms 55. The rotary actuator 56 is disposed on a frame 61.

Figure 7:
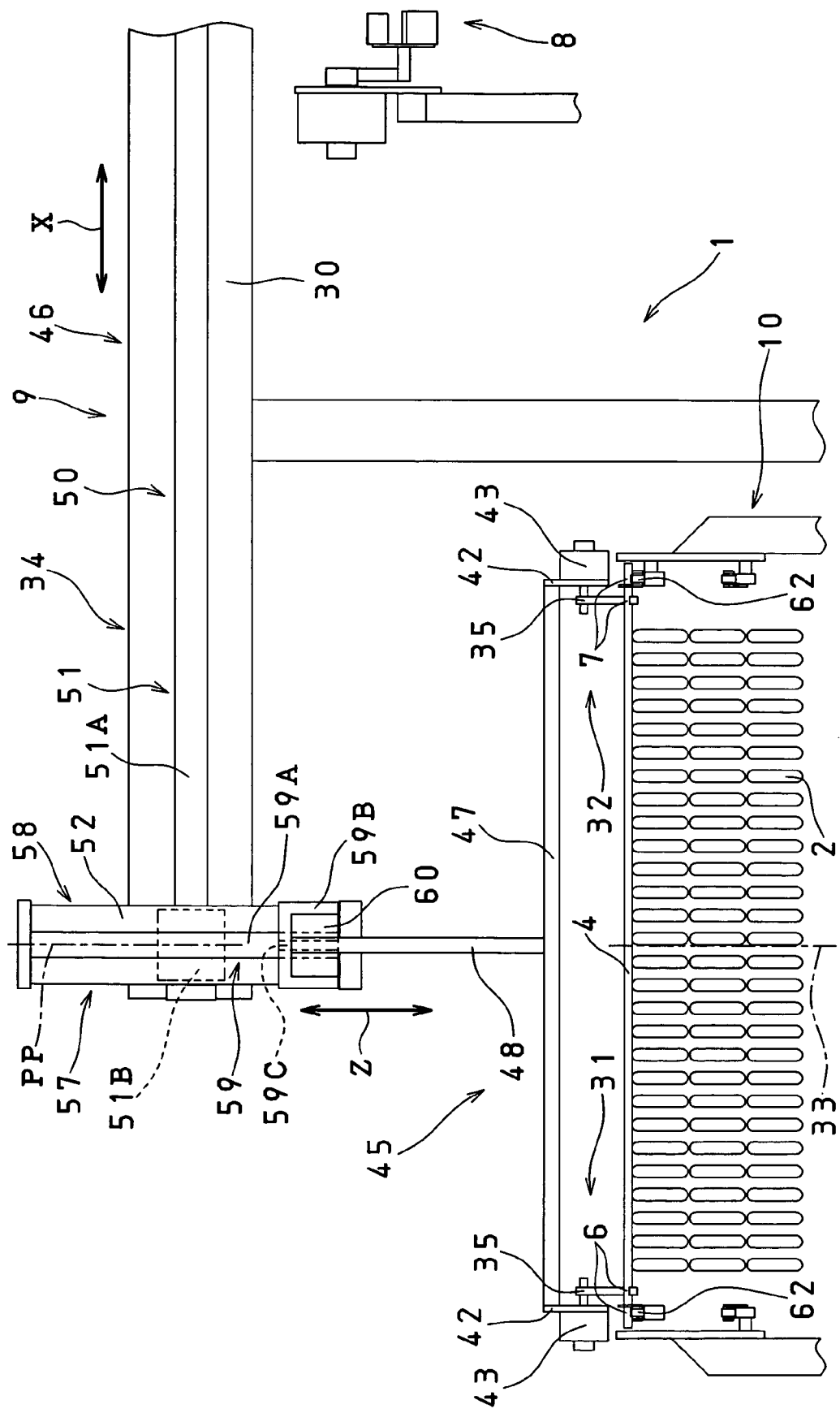
FIG. 7 is a front elevational view of a transferring means provided with the lowering means and is a diagram explaining the operation.

Instead of the above-described lowering means 53, a lowering means 57 in an example shown in FIG. 7 may be configured to include a vertically reciprocatingly driving means 58, e.g., a known pneumatic rodless cylinder 59, which is disposed on the reciprocating means 46 so as to be interposed between the rod member 48 and the horizontally movable base 52 and is adapted to raise or lower the rod member 48 in a direction Z. The rodless cylinder 59 has a cylinder tube 59A, a body 59B, and a piston 59C, and is mounted on the horizontally movable base 52 which is longer in the direction Z than the above-described lowering means 53. A vertically movable base 60 is secured to the body 59B which reciprocates in the direction Z. The supporting mechanism 45 in this example has the pair of mounting plates 42, the horizontal rod 47, and the rod member 48. The rod member 48 is secured to the vertically movable base 60, and is adapted to raise or lower the stick removing and supporting means 31 and 32 in the direction Z by the actuation of the rodless cylinder 59.

As shown in FIGS. 6A and 6B, the conveying means 10 has a pair of conveying endless chains 62 which travel in the direction Y. The conveying means 10 is adapted to receive the both end portions 6 and 7 of the stick 4 which has been transferred by the transferring means 9, and to convey a plurality of sticks 4 accumulated in the direction Y as the conveying endless chains 62 travel. The conveying means 10 conveys the sticks 4 to the downstream side of the conveying path 33 in the direction Y.

Figure 4:
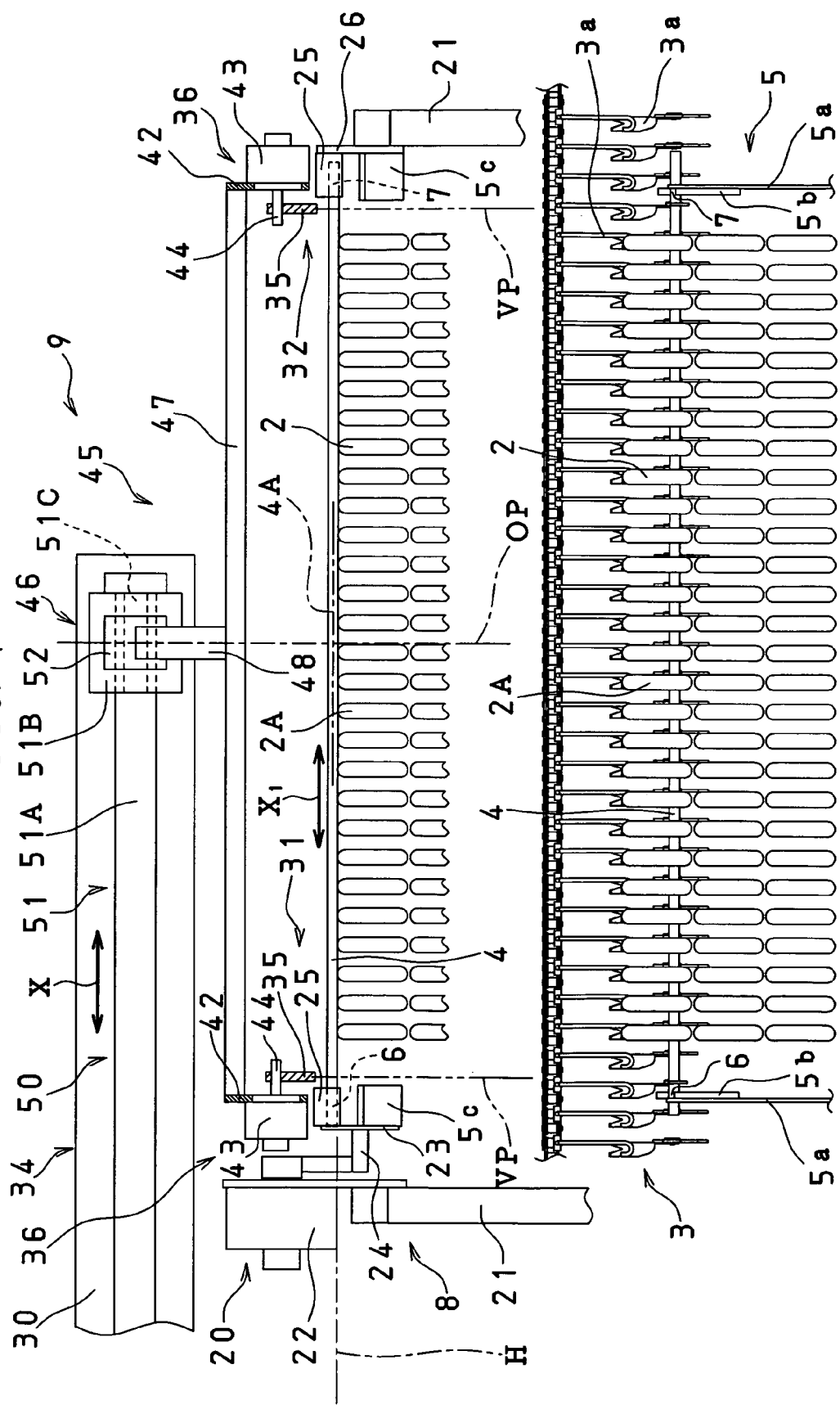
FIG. 4 is a partially enlarged front elevational view of the embodiment shown in FIG. 2.
Figure 8:
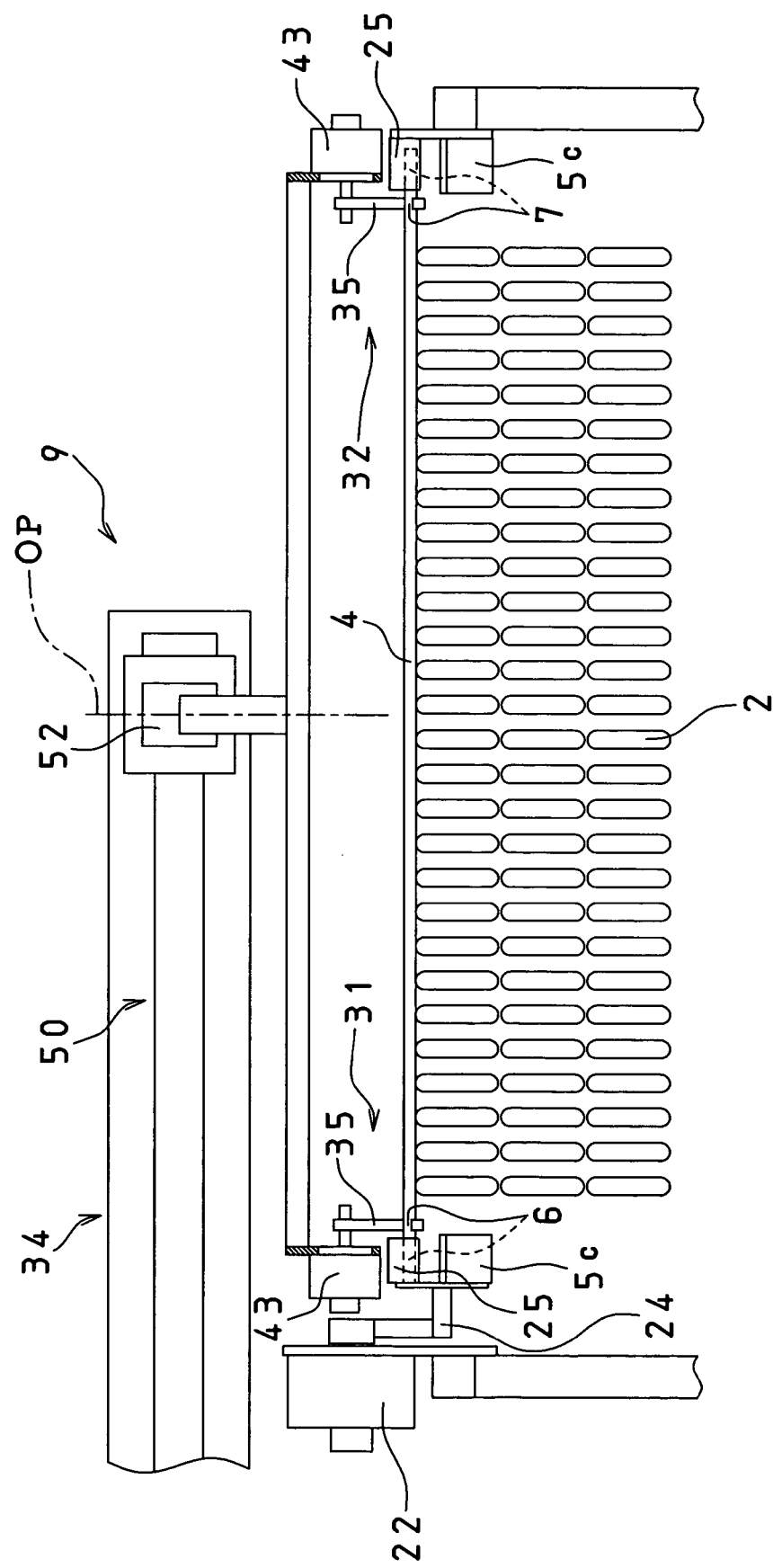
FIG. 8 is a diagram explaining the operation of the embodiment shown in FIG. 2.
Figure 9:
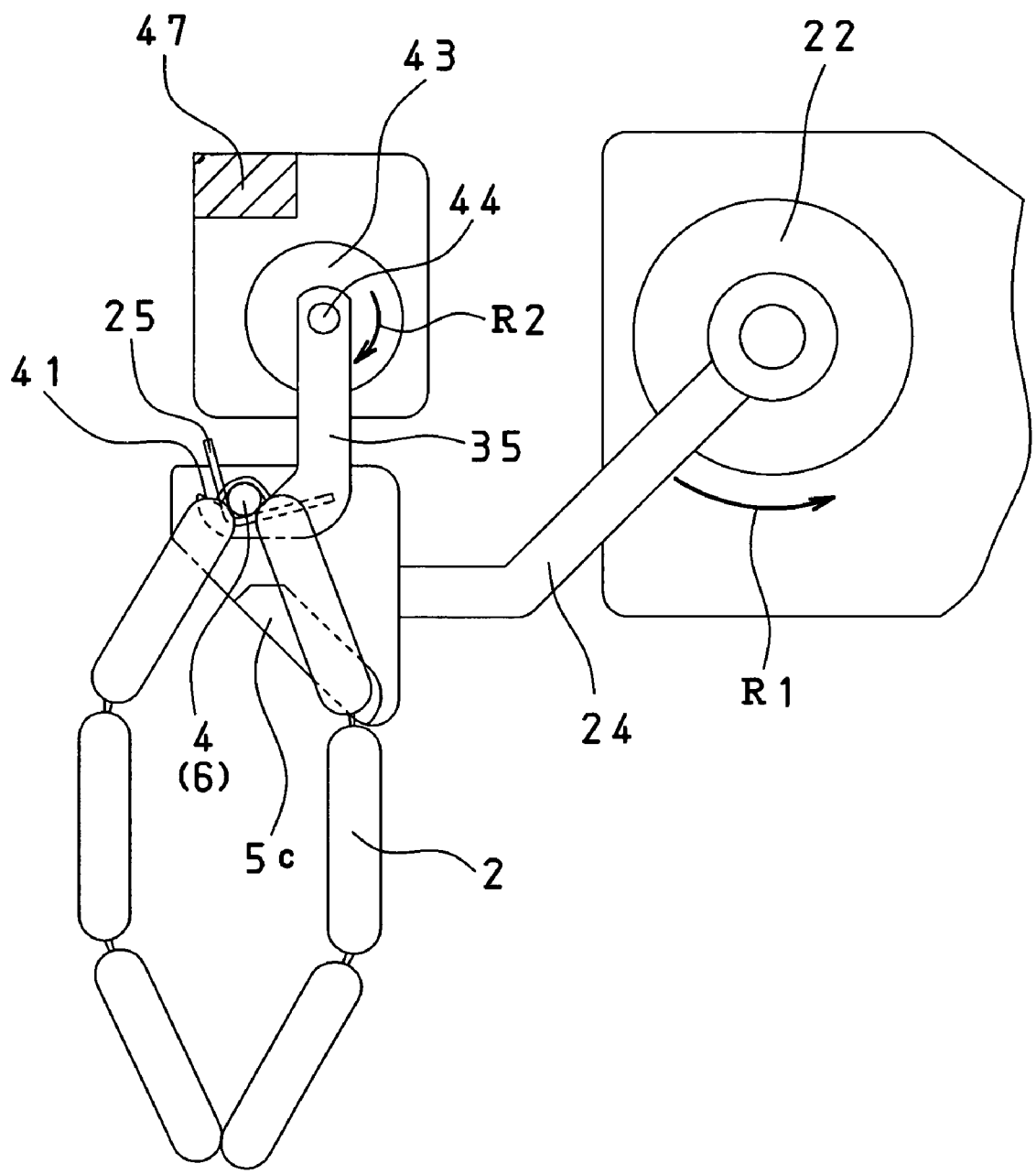
FIG. 9 is a diagram explaining the operation of the embodiment shown in FIG. 2.
Figure 10:
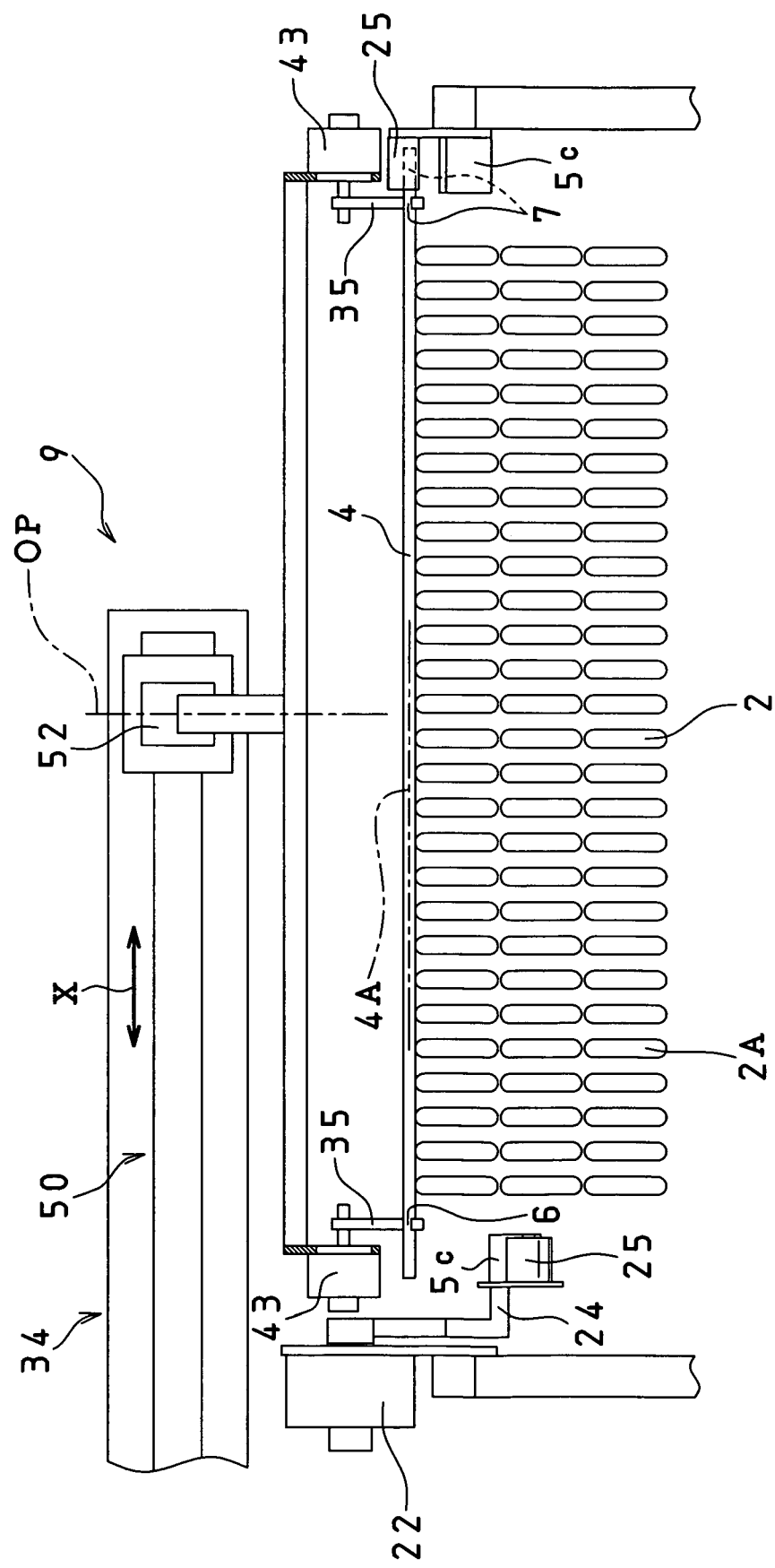
FIG. 10 is a diagram explaining the operation of the embodiment shown in FIG. 2.
Figure 11:
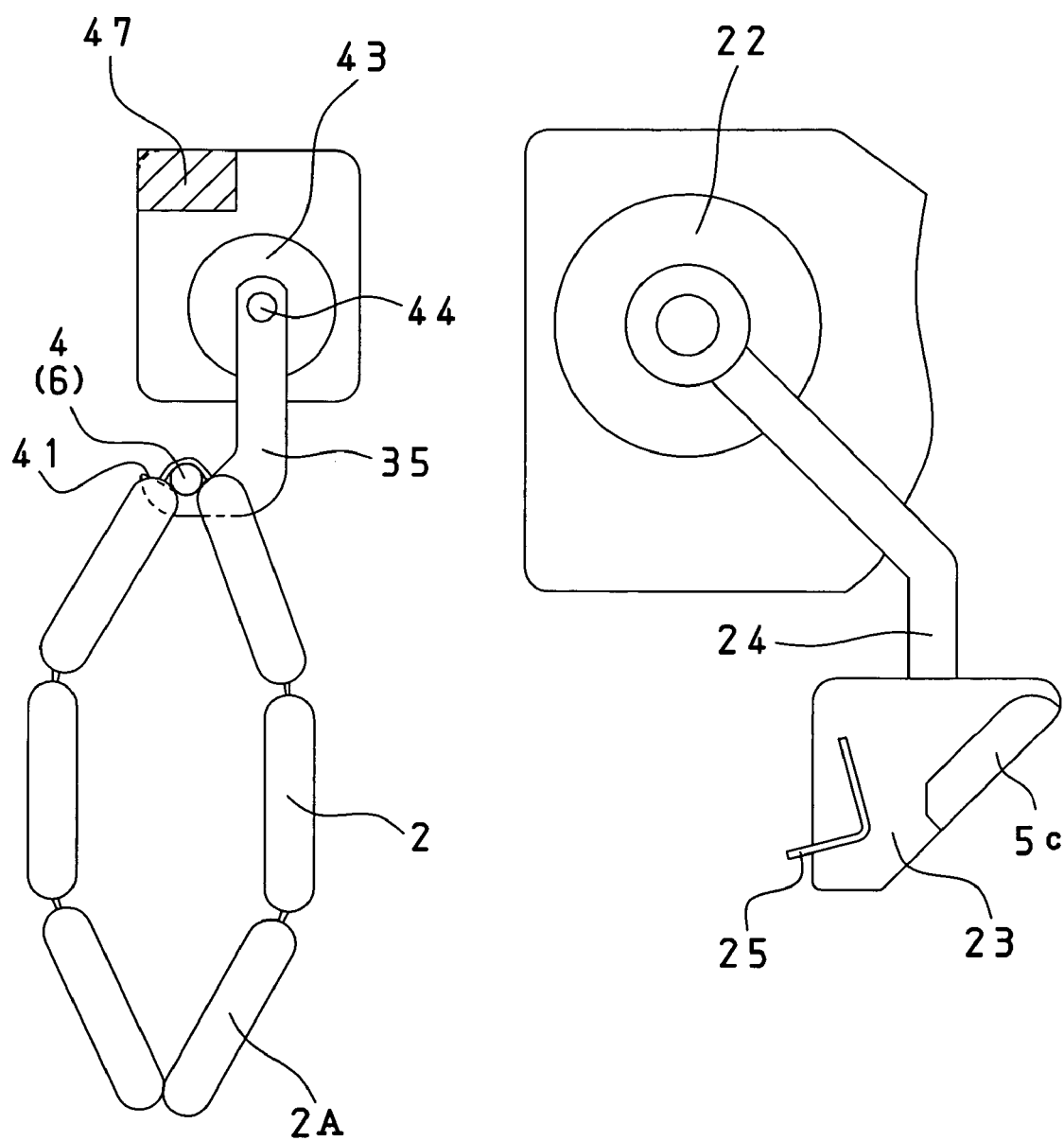
FIG. 11 is a diagram explaining the operation of the embodiment shown in FIG. 2.

In the transferring apparatus 1 having the above-described construction, as for the stick removing and supporting means 31 and 32 which returned from the conveying means 10 to an original position OP on the stick supporting and relaying means 8, as shown particularly in FIGS. 4 and 5, the rotary actuators 43 are actuated to rotate the respective transfer hooks 35 in the direction R2, so as to remove the stick 4 which has already been supplied onto the stick supporting and relaying means 8 manually or by the stick supplying means 5. As shown in FIGS. 8 and 9, the removing recessed surfaces 41 of the transfer hooks 35 are thereby brought immediately below the end portions 6 and 7 of the stick 4, and slightly scoop up the end portions 6 and 7. As a result, the end portions 6 and 7 which were supported on the stick receivers 25 are supported by the removing recessed surfaces 41 of the transfer hooks 35. In this state, the rotary actuator 22 is actuated, so that the relay arm 24 is rotated in the direction R1, and the one stick receiver 25 retreats from the path of transfer of the stick 4 and the loops 2A to the conveying means 10, as shown in FIGS. 10 and 11.

Figure 12:
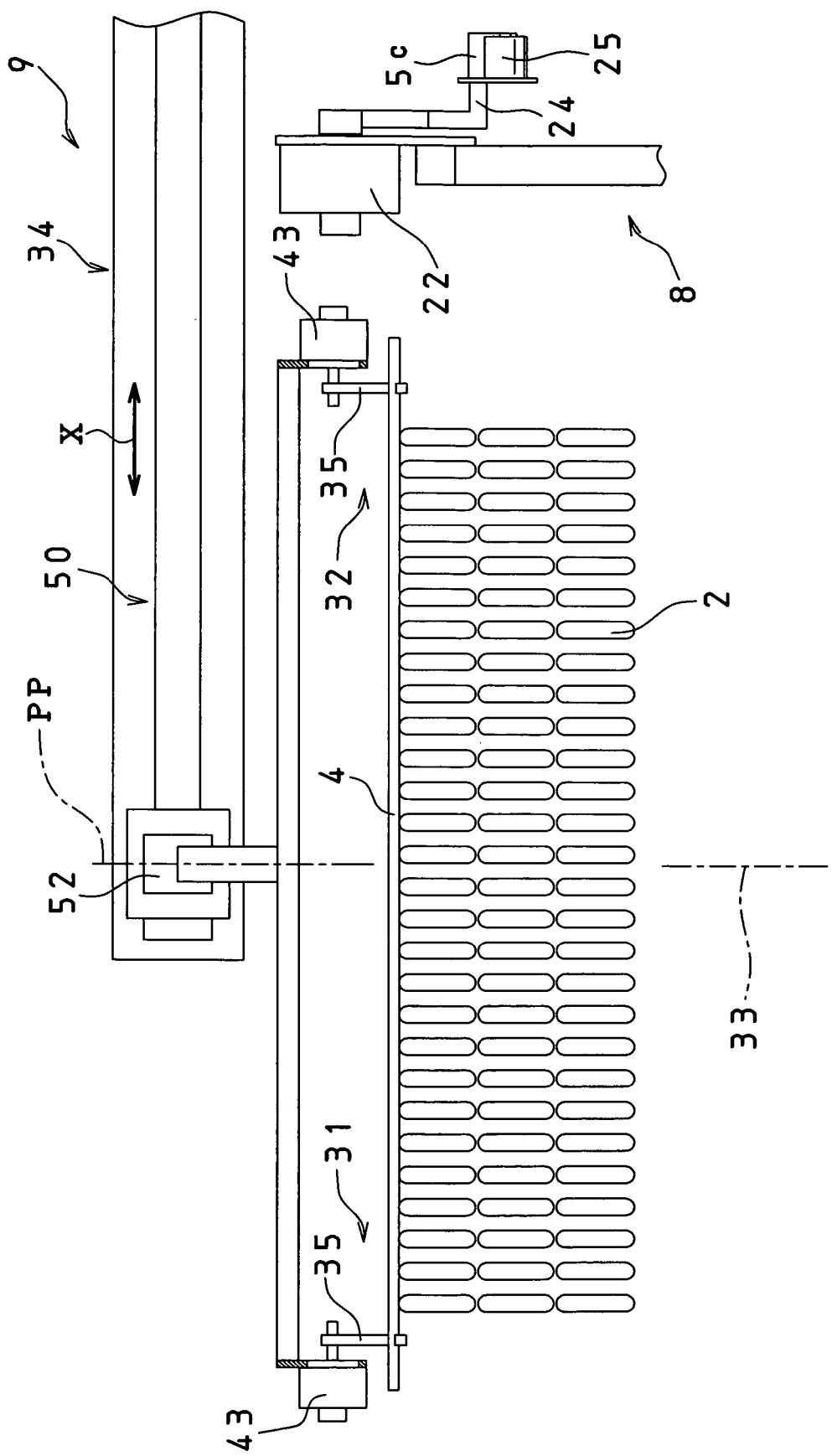
FIG. 12 is a diagram explaining the operation of the embodiment shown in FIG. 2.

Thus, the pair of stick removing and supporting means 31 and 32 remove and support the both end portions 6 and 7 of the stick 4 with the sausage suspended therefrom from the stick supporting and relaying means 8. Subsequently, when the horizontally reciprocatingly driving means 50 is operated, the horizontally movable base 52 is caused to travel in the direction X, as shown in FIG. 12. Concurrently, the stick 4 is also caused to travel in the direction X and is conveyed to a predetermined position PP on the conveying path 33, and stops there. After the stick 4 is caused to travel in the direction X by means of the moving means 34, the stick supporting and relaying means 8 actuates the rotary actuator 22 again to rotate the relay arm 24 in the direction R1. As shown in FIGS. 4 and 5, the one stick receiver 25 is thereby returned to the original position OP so as to prepare for the supply of an ensuing stick 4 manually or from the stick supplying means 5.

Referring to FIGS. 6A and 6B, the stick receiving portions 55a of the lifting arms 55 wait for the passage of the loops 2A at positions below the loops 2A which are transferred toward the aforementioned predetermined position PP. After the passage of the loops 2A, the stick receiving portions 55a are raised toward positions immediately below the stick 4 on the transfer hooks 35 as the lifting arms 55 are rotated in a direction R3. When the raising of the stick receiving portions 55a is finished, the stick removing and supporting means 31 and 32 which were at a standstill at the predetermined position PP on the aforementioned conveying passage 33 rotate their transfer hooks 35 upwardly in the direction R2, thereby releasing the support of the stick 4. The stick receiving portions 55a at their raised end positions receive the both end portions 6 and 7 which dropped from the transfer hooks 35.

When the transfer hooks 35 of the stick removing and supporting means 31 and 32 are rotated upwardly and are returned to their original positions, the reciprocating means 46 is operated to move the stick removing and supporting means 31 and 32 in the direction X, so that the stick removing and supporting means 31 and 32 are returned to the original position OP shown in FIG. 4.

Upon arrival of the conveying endless chains 62 having a sufficient space for the delivery of the stick 4, as shown in FIGS. 6A and 6B, the lowering means 53 rotates its lifting arms 55 downwardly in a direction R4, thereby allowing the stick receiving portions 55a which were at a standstill at their raised end positions to be lowered to positions below the conveying endless chains 62. Hence, the stick 4 is placed on the conveying endless chains 62 which travel in the direction Y. As the conveying endless chains 62 travel, the support of the stick 4 by the stick receiving portions 55a is released, and the stick 4 is conveyed in the direction Y. Subsequently, the lifting arms 55 are rotated in a direction R5 to set the stick receiving portions 55a again on standby at positions below the loops 2A.

Next, referring to FIG. 7, a description will be given of the operation of the transferring apparatus 1 in which the reciprocating means 46 is provided with the lowering means 57 in accordance with the other example. Upon arrival of the conveying endless chains 62 having a sufficient space for the delivery of the stick 4, the lowering means 57 which was at a standstill at the predetermined position PP actuates its rodless cylinder 59. Thus, the stick 4 supported by the stick removing and supporting means 31 and 32 are lowered to positions above and immediately close to the conveying endless chains 62. When the stick 4 has arrived at the positions above and immediately close to the conveying endless chains 62, the rotary actuators 43 are actuated to rotate the transfer hooks 35 upwardly in the direction R2. The stick 4, whose support by the transfer hooks 35 has been released, is placed on the conveying endless chains 62, and is conveyed in the Y direction. By so doing, the period of delivering the stick 4 onto the conveying means 10 can be speeded up, so that the return of the stick removing and supporting means 31 and 32 to the stick supporting and relaying means 8 can be speeded up.

Since the stick 4 is delivered onto the conveying endless chains 62 by rotating the transfer hooks 35, even if the transfer hooks 35 are located on the downstream side in the conveying direction Y relative to the stick 4, the conveyance of the stick 4 in the downstream direction is not hampered. It should be noted that in the case of the apparatus configured such that the transfer hooks 35 are located on the upstream side in the conveying direction Y relative to the stick 4, the support of the stick 4 by the transfer hooks 35 may be released by the traveling of the conveying endless chains 62 without rotating the transfer hooks 35.

After the delivery of the both end portions 6 and 7 onto the conveying means 10 by means of the stick removing and supporting means 31 and 32, the lowering means 57 actuates its rodless cylinder 59 to raise the rod member 48 and return it to its original position. Further, the rodless cylinder 51 is actuated to cause the horizontally movable base 52 to travel in the direction X, thereby returning the stick removing and supporting means 31 and 32 to the original position OP shown in FIG. 4.

In either one of the transferring means 9 having the lowering means 53 and the transferring means 9 having the lowering means 57, the above-described operation is repeated each time the stick removing and supporting means 31 and 32 are returned to the original position OP. In a case where the return of the transferring means 9 is speeded up, and the stick 4 has not yet been supplied to the stick supporting and relaying means 8, the operation waits for the supply of the stick 4.

In the above-described transferring apparatus 1, the cycle of supplying the stick 4 and the cycle of transferring the stick 4 by the transferring means 9 need not be synchronized. Thus, it is possible to improve productivity by enhancing the operation rate of the transferring apparatus 1.

In the transferring means 9, the stick 4 is moved horizontally in the direction X on the conveying path 33 by supporting the both end portions 6 and 7. Therefore, as compared with the cantilevered support of the stick 4, the deflection of the stick 4 can be made small, and it is possible to eliminate the possibility of the dropping of the sausage 2 or the stick 4 during transfer. At the same time, a large space is not required for the transfer of the stick 4. Moreover, since the stick 4 being supported by the stick supporting and relaying means 8 can be transferred to the conveying path 33 without requiring man power. Hence, the transferring apparatus 1 is suitable for automation and labor saving.

In the stick supporting and relaying means 8, in a case where the cycle of supplying the stick 4 is faster than the cycle of transferring the stick 4 by the transferring means 9, the plurality of sticks 4 may be supplied to and placed on the stick supporting and relaying means 8 in advance. By so doing, even if a situation occurs in which the cycle of supplying the stick 4 is delayed, it is possible to avoid the delay of the cycle of transferring the stick 4.

Since the stick 4 is placed on the reciprocatable transfer hooks 35 and is supported thereon, the reception of the stick 4 from the stick supporting and relaying means 8 and the delivery of the stick 4 to the lowering means 53 or the conveying means 10 can be attained with simple operation.

The relay arm rotating means 20, the transfer hook rotating means 36, the horizontally reciprocatingly driving means 50, and the lifting arm rotating means 54, and the vertically reciprocatingly driving means 58 are not limited to those using air as driving sources, and it is possible to use other known means including electric motors/electric actuators, hydraulic motors/hydraulic actuators, wrapping connector means using chains or belts, or the like.

In the stick supporting and relaying means 8, in addition to the retreat of the one stick receiver 25, the other stick receiver 25 may also be retreated so as to deliver the end portions 6 and 7 being supported on the both stick receivers 25 to the transfer hooks 35.

As shown in FIGS. 1 and 13 to 15, the transferring apparatus 1 further includes a stick delivering means 70, a swiveling means 80, and a stick taking-off means 90. The stick delivering means 70 sequentially separates, starting with a leading stick 4-1, the plurality of sticks 4 which have been conveyed in parallel by the conveying means 10 in the direction Y. The stick delivering means 70 then moves the separated stick 4-2 in the direction B and delivers it onto the swiveling means 80 located at a predetermined distance L1. The swiveling means 80 has a swivel body 124 on which the plurality of sticks 4 have been arranged at pitches of a stick arrangement angle α, e.g., 45 degrees, about the swiveling axis 123. The swivel body 124 is adapted to swivel about the swiveling axis 123 in a direction R6 in a given plane, e.g., in the substantially horizontal plane H, and to transfer the plurality of sticks 4 in series. The stick taking-off means 90 is disposed in such a manner as to be spaced apart from the stick delivering means 70 by a stick transferring angle β about the swiveling axis 123, e.g., by 180 degrees, and takes off from the swiveling means 80 a supported stick 4-3 supported on the swiveling means 80. The stick taking-off means 90 is adapted to take off the supported stick 4-3, which has been swiveled by the stick transferring angle β by the swiveling means 80, and then to put onto a stick juxtaposing and supporting means 100 in parallel to a stick 4-5 taken off earlier from the swiveling means 80.

The stick delivering means 70 includes a stick separating means 144 for placing thereon the plurality of sticks 4 in parallel and moving them in the direction B, and for sequentially separating the leading stick 4-1 from the following set of the plurality of sticks 4 placed in parallel by moving in the direction B only the leading stick 4-1 among the plurality of sticks 4. The stick delivering means 70 further includes a separated stick moving means 145 for delivering the separated stick 4-2 onto a pair of stick supporting members 125 and 126 provided on the swivel body 124 by moving along a stick moving path 71 a pair of delivery arms 162 on which the separated stick 4-2 has been transferred from the stick separating means 144.

The stick moving path 71 extends in the stick moving direction B substantially perpendicular to the longitudinal axis 4A of the separated stick 4-2 through a passage point 4B which is an approximately half-length point of a stick length l1 of the separated stick 4-2 in a given position on the pair of delivery arms 162.

Figure 15:
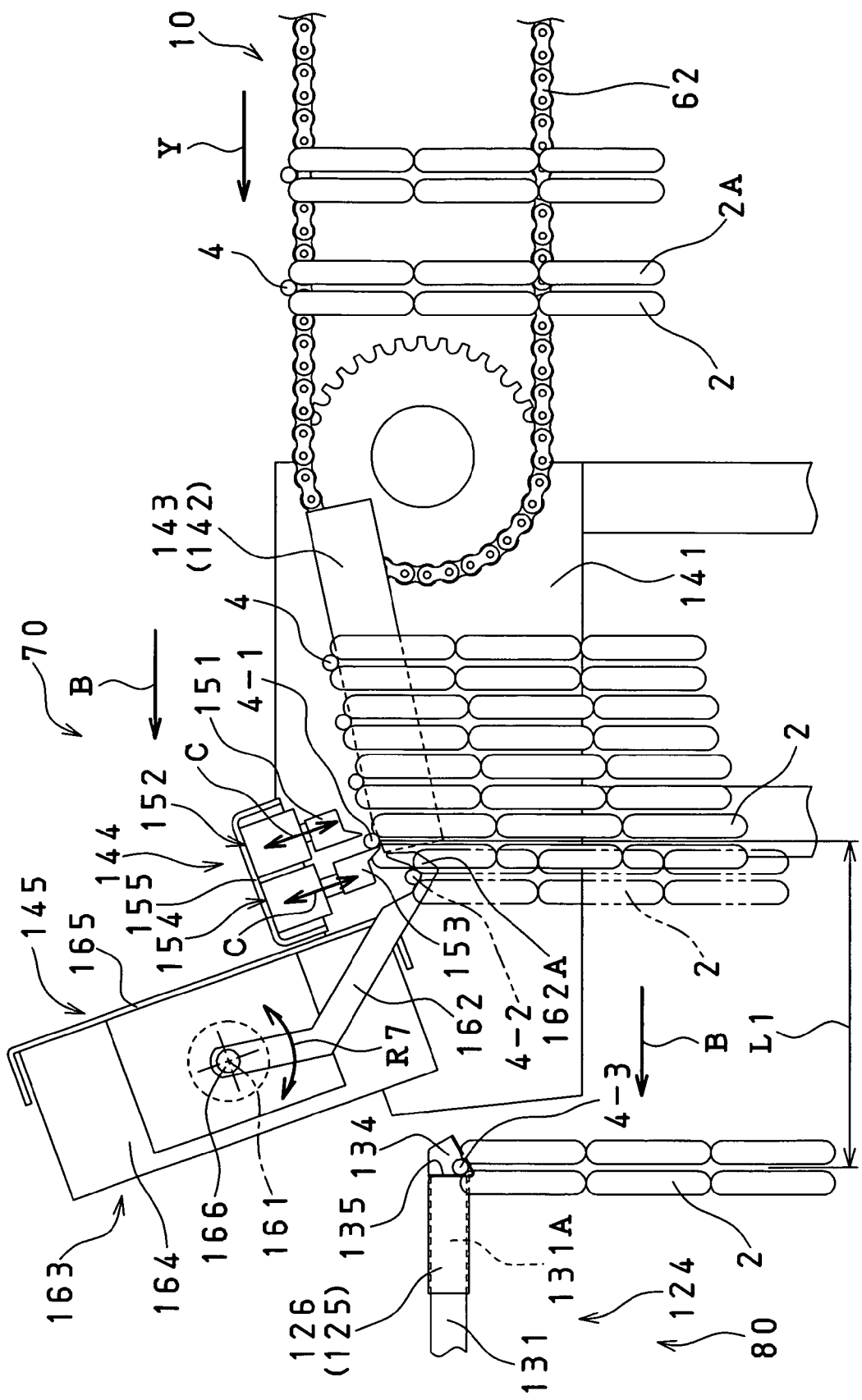
FIG. 15 is a cross-sectional view taken along line 16-16 in FIG. 16, and illustrates mainly a stick delivering means.
Figure 16:
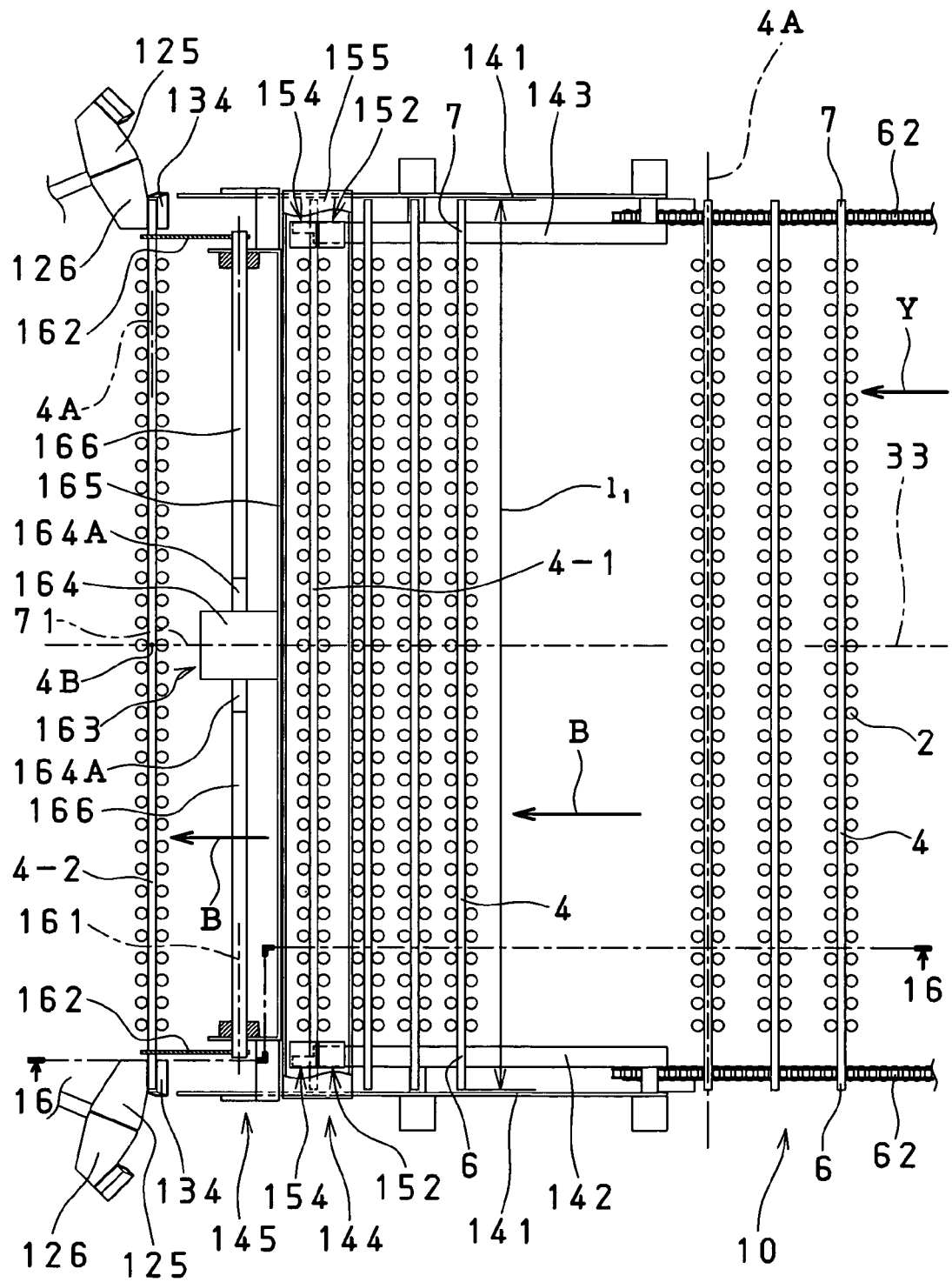
FIG. 16 is a plan view of FIG. 15.
Figure 17:
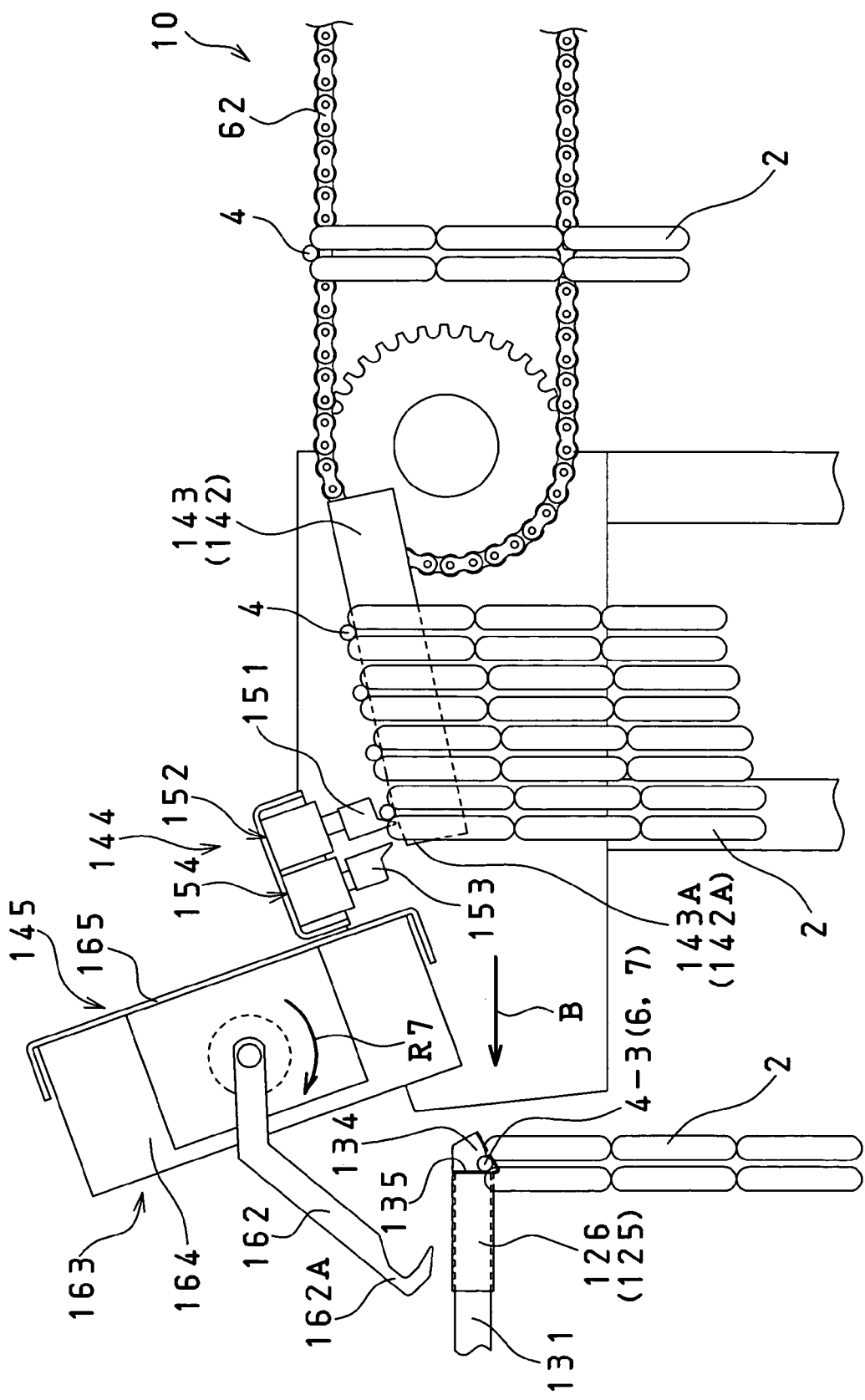
FIG. 17 is a cross-sectional view taken along line 16-16 in FIG. 16, for explaining the delivery of the stick by the stick delivering means.

As particularly shown in detail in FIGS. 15 to 17, the stick separating means 144 has a pair of inclined separating chutes 142 and 143 which are mounted on a supporting frame 141 and are adapted to place thereon and support the end portions 6 and 7 of the stick 4 to cause the stick 4 to slip down and move in the direction B. The plurality of sticks 4 are supported by the separating chutes 142 and 143 in parallel in the direction B, i.e., such that the end portions 6 and 7 of the leading stick 4-1 and the end portions 6 and 7 of the ensuing stick 4 oppose each other in the direction B and are arranged in a row in the direction B.

The stick separating means 144 further includes an upstream-side escape mechanism 152 having a reciprocating member 151 and a downstream-side escape mechanism 154 having a reciprocating member 153, the escape mechanisms 152 and 154 being disposed on a bracket 155. The upstream-side escape mechanism 152 and the downstream-side escape mechanism 154 are adapted to prevent or allow the slipping down of the end portions 6 and 7 of the leading stick 4-1 as the reciprocating members 151 and 153 are respectively advanced or retracted in a direction C by known air cylinders. The stick separating means 144 is adapted to discharge only the leading stick 4-1 one by one from distal end portions 142A and 143A of the separating chutes 142 and 143 as the reciprocating members 151 and 153 are alternately advanced and retracted. In this way, the leading stick 4-1 is separated from the plurality of sticks 4.

The separated stick moving means 145 includes the pair of delivery arms 162 for receiving the respective end portions 6 and 7 at hook portions 162A; a delivery arm rotating means 163, e.g., a known pneumatic rotary actuator 164, for causing the pair of delivery arms 162 to rotate about an axis 161 in a direction R7; and a supporting base 165 for mounting the rotary actuator 164. The pair of delivery arms 162 are secured to a rotating shaft member 166 connected to an output rotating shaft 164A of the rotary actuator 164.

In a standby state shown in FIG. 15 the separated stick moving means 145 receives at the pair of delivery arms 162 the separated stick 4-2 which is discharged from the distal end portions 142A and 143A. After this reception, the rotary actuator 164 is actuated to rotate the pair of delivery arms 162 in the direction R7, as shown in FIG. 17, thereby causing the end portions 6 and 7 to abut against preventing wall surfaces 135 of recesses 134 of the stick supporting members 125 and 126. As a result, the stick 4-2 is released from its support by the hook portions 162A, and is transferred onto the recesses 134.

Since the escape mechanisms 152 and 154 are located at the distance L1 from the stick supporting members 125 and 126, it is possible to prevent the mutual contact of the sausage 2 suspended from the stick 4-3 being swiveled by the swivel body 124, which will be described later, and the sausage 2 which is suspended from the stick 4 and is prevented from slipping down by the escape mechanisms 152 and 154. Since the separated stick moving means 145 places the stick 4-2 on the hook portions 162A, and delivers the stick 4-2 to the stick supporting members 125 and 126 by the rotation of the pair of delivery arms 162, the structure and operation of the stick delivering means 70 are simple.

Figure 18:
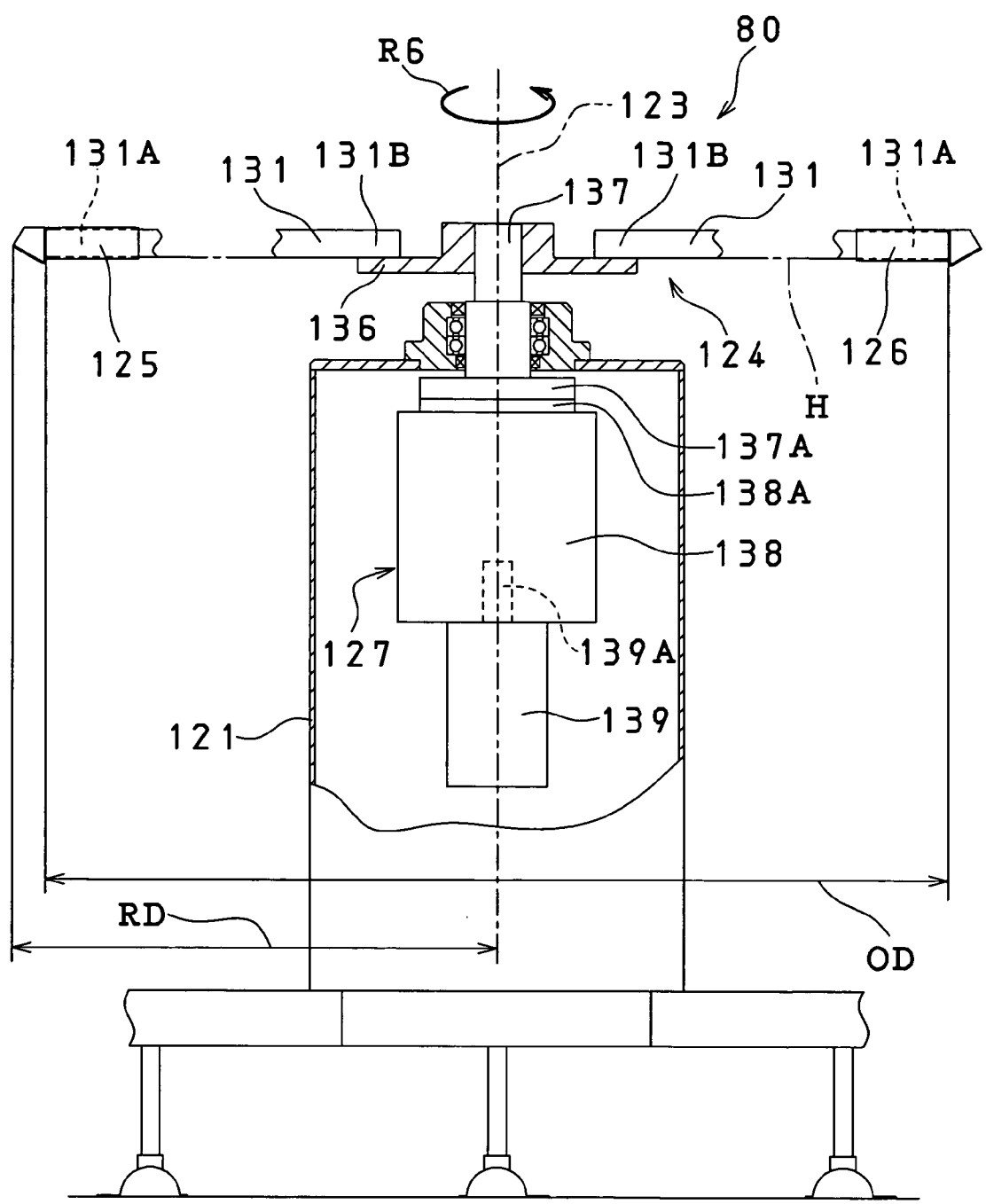
FIG. 18 is a partially enlarged front cross-sectional view of a swiveling means of the apparatus shown in FIG. 14.
Figure 19:
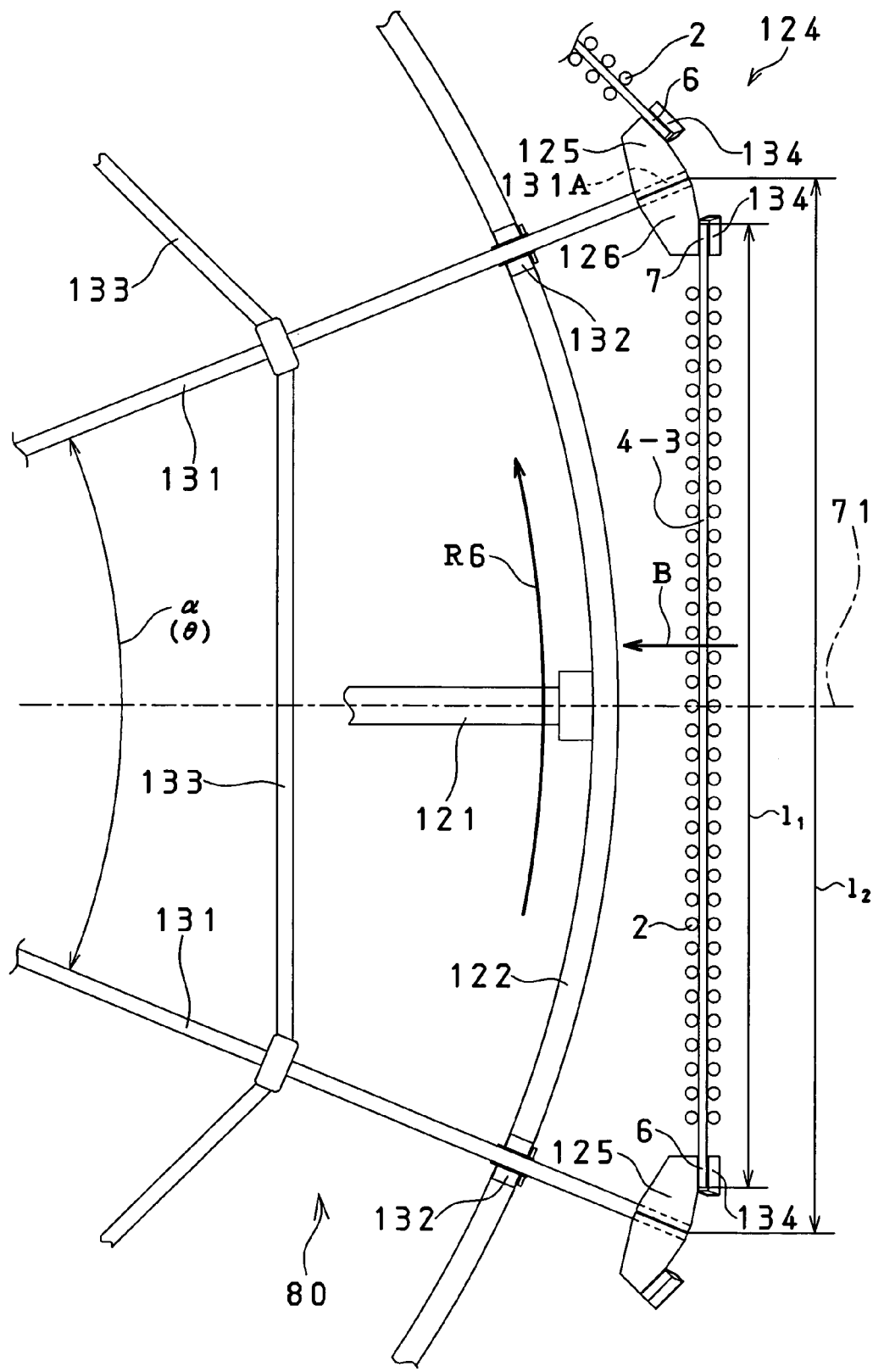
FIG. 19 is a partially enlarged plan view of the swiveling means.
Figure 20:
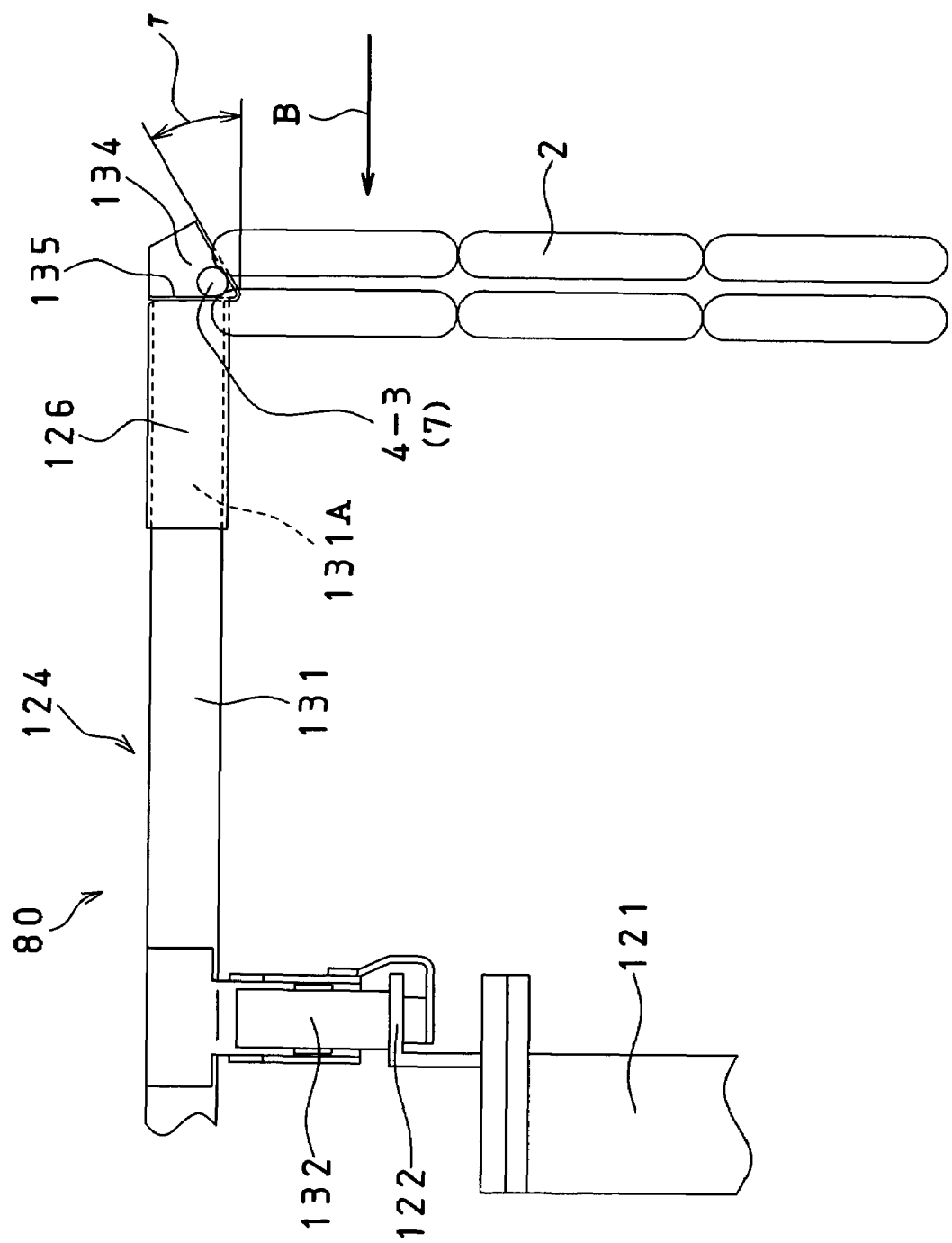
FIG. 20 is an enlarged front elevational view taken along a swivel arm shown in FIG. 19.

As particularly shown in detail in FIGS. 18 to 20, the swiveling means 80 includes a supporting frame 121; an annular race 122; the swivel body 124 disposed so as to be capable of swiveling about the swiveling axis 123; and a plurality of pairs, e.g., 8 pairs, of stick supporting members 125 and 126 for supporting the end portions 6 and 7 of the stick 4. The pairs of stick supporting members 125 and 126 are provided on the swivel body 124 about the swiveling axis 123 at intervals of the stick arrangement angle α corresponding to an angle θ of a circular arc whose length of chord is a length l2 corresponding to the length l1 of the stick 4, e.g., at intervals of 45 degrees. The swiveling means 80 further includes a swivel body driving means 127 for swiveling the swivel body 124.

The plurality of pairs, e.g., 8 pairs, of stick supporting members 125 and 126 are provided about the swiveling axis 123 so as to be capable of arranging the plurality of sticks 4 in a polygonal shape, e.g., an octagonal shape. The pairs of stick supporting members 125 and 126 are disposed at positions spaced apart a swivel radius RD from the swiveling axis 123.

The swivel body 124 includes a plurality of, e.g., 8, swivel arms 131 arranged radially at pitches of the stick arrangement angle α, e.g., 45 degrees, about the swiveling axis 123 located on the stick moving path 71 in the given plane, e.g., the substantially horizontal plane H; support rollers 132 serving as movable bodies which are attached to the swivel arms 131 and move by coming into rolling contact with the race 122; a plurality of rod members 133 for maintaining the mutual angle between the swivel arms 131 at the stick arrangement angle α, e.g., 45 degrees; and a flange-like base plate 136. The swivel arms 131 are supported by the race 122. The stick supporting members 125 and 126 are secured to one end portions 131A, while the other end portions 131B are secured to the base plate 136 mounted on a swiveling shaft member 137.

Each of the stick supporting members 125 and 126 has the recess 134 for receiving the end portion 6 or 7, as well as the preventing wall surface 135 for abutting against the end portion 6 or 7 in the direction B. The recess 134 is so structured as to have an angle of inclination γ toward the separated stick moving means 145, so that the transfer of the stick 4 from the separated stick moving means 145 to the recesses 134 can be effected stably.

The swivel body driving means 127 includes the swiveling shaft member 137 disposed on the swiveling axis 123 and extending substantially vertically; a speed reducer 138 supported by the supporting frame 121 and having an output rotating shaft 138A to which a flange portion 137A of the swiveling shaft member 137 is secured; and an electric motor 139 secured to the speed reducer 138 and having an output rotating shaft 139A disposed on the same axis as that of the swiveling shaft member 137 and fitted to the speed reducer 138. The speed reducer 138 supports the other end portions 131B of the swivel arms 131. The swiveling shaft member 137 and the output rotating shaft 139A are coupled to each other by means of the speed reducer 138.

The electric motor 139 is adapted to intermittently swivel the swivel arms 131 at pitches of 45 degrees, i.e., the stick arrangement angle α. Thus, in this embodiment, the swivel body 124 is adapted to swivel and transfer the stick 4 by 180 degrees, i.e., the stick transferring angle β, by four intermittent swivelings of the swivel body 124. Although in this embodiment the swivel body 124 is intermittently swiveled, the delivery and the taking off of the stick 4 may be effected while continuously swiveling the swivel body 124.

In this embodiment, the stick supporting members 125 and 126 are adapted to swivel in the substantially horizontal plane H, and the stick delivering means 70 is adapted to deliver the stick 4 from above the substantially horizontal plane H to the stick supporting members 125 and 126.

Therefore, the stick supporting members 125 and 126 do not particularly require the operation for receiving the stick 4, so that the structure and operation of the swiveling means 80 becomes extremely simple. Since the swivel body 124 swivels in the substantially horizontal plane H, the sausage 2 does not move in a substantially vertical direction, so that the inspection and correction operation is facilitated.

In the swiveling means 80, since the swivel body 124 has the swivel arms 131 whose weight is small and whose inertia is small, the movement of the swivel body 124 can be controlled easily. In addition, the race 122 is provided to support the swivel arms 131, even if the diameter OD of the swivel body 124 is large, e.g., 5 meters, the positional accuracy of the swivel body 124 is high. Since the swivel body 124 is intermittently swiveled at an angle equal to the stick arrangement angle α, the accuracy of the stop position of the stick supporting members 125 and 126 can be enhanced. Additionally, since the electric motor 139 disposed coaxially with the swiveling shaft member 137 drives the swivel body 124, the movement of the swivel body 124 can be controlled easily. Furthermore, the structure of the swivel body driving means 127 becomes simple and compact.

In this embodiment, although the swivel body 124 swivels in the substantially horizontal plane H, the swivel body 124 in accordance with the invention may be swiveled in the given plane. The given plane may be an inclined plane, for example. Further, the given plane is not limited to a flat plane, and may be any one of a wavy plane, a curved plane, and the like. If such a plane is used, the height of the swivel body 124 can be adjusted to the height of the stick delivering means 70 and the stick taking-off means 90.

Figure 21:
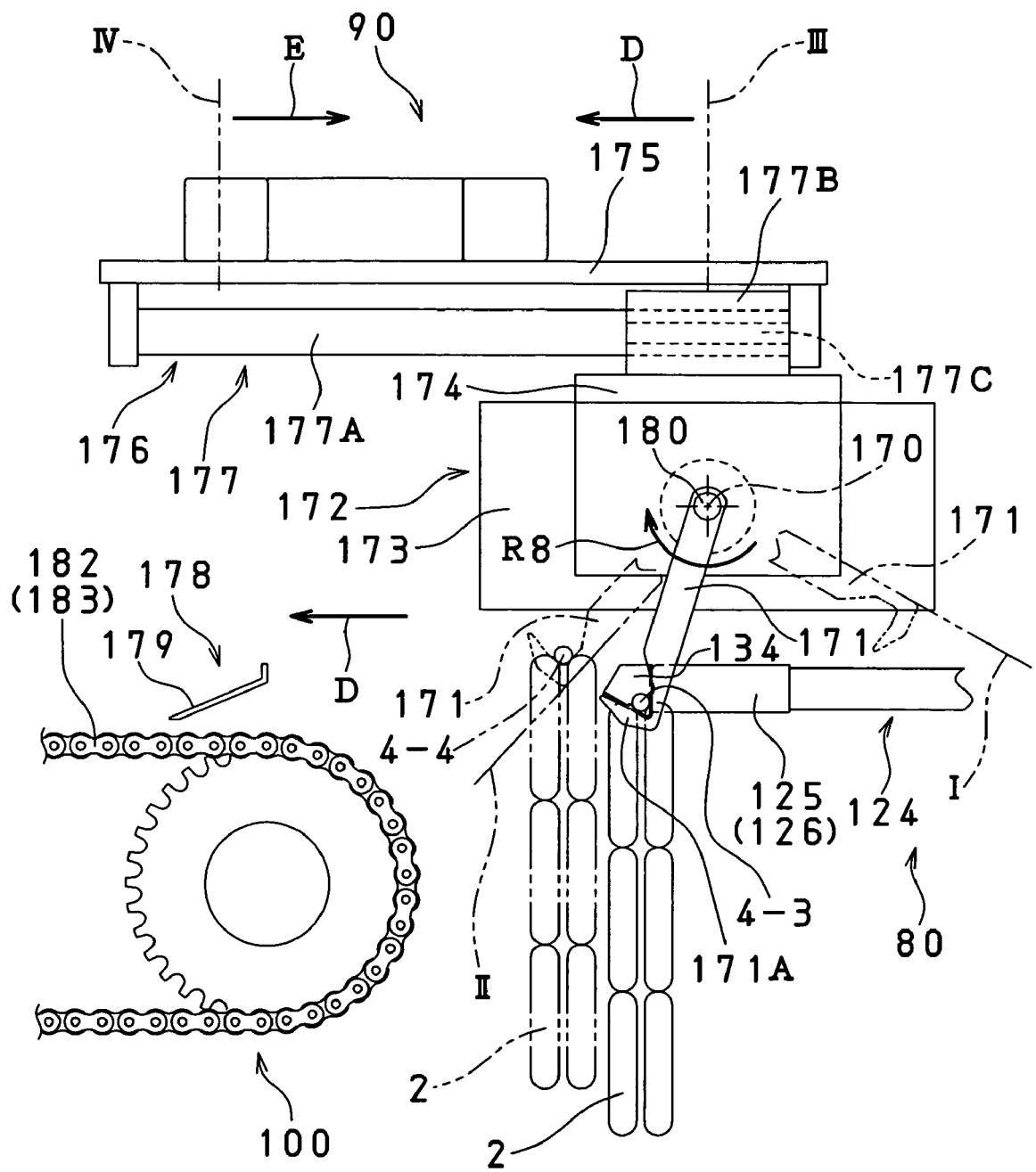
FIG. 21 is a partially enlarged front cross-sectional view of mainly a stick taking-off means of the apparatus shown in FIG. 14.
Figure 22:
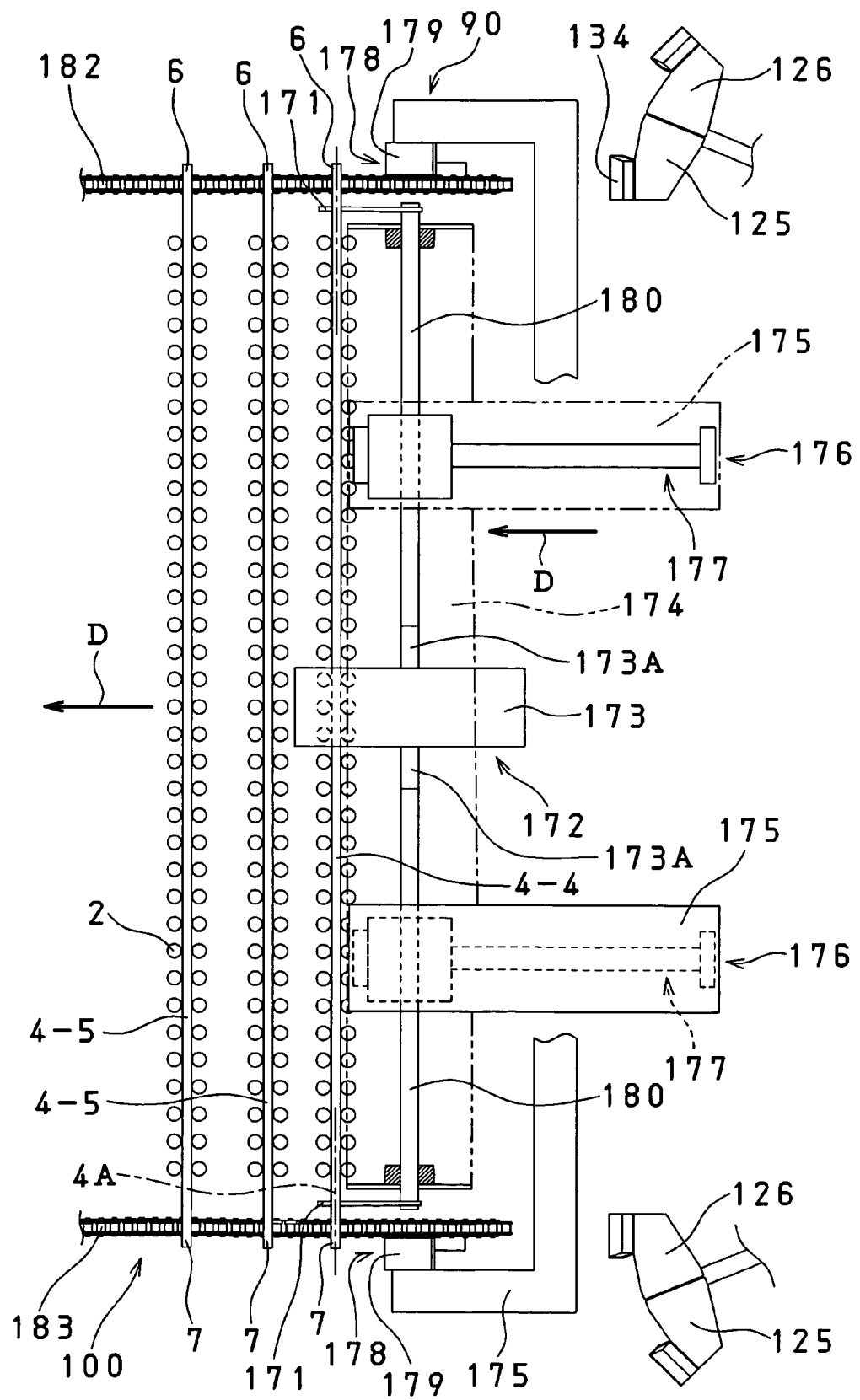
FIG. 22 is a partially cutaway plan view of FIG. 21.
Figure 23:
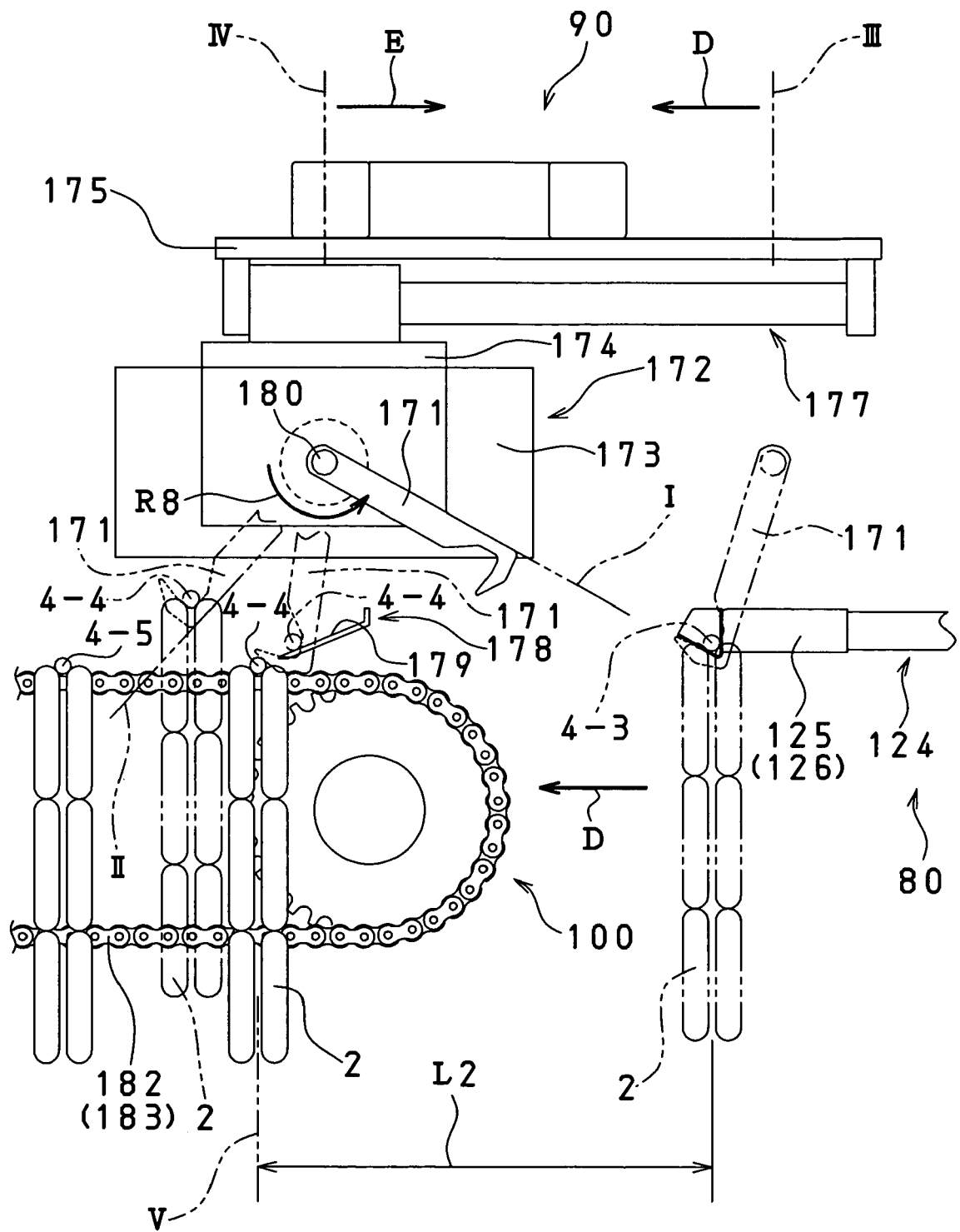
FIG. 23 is a front elevational view explaining the taking off of the stick by the stick taking-off means.

As particularly shown in detail in FIGS. 21 to 23, the stick taking-off means 90 includes a pair of taking-off arms 171 which catch and receive by their hook portions 171A the end portions 6 and 7 accommodated in the respective recesses 134, and which are capable of rotating the end portions 6 and 7 about an axis 170 in a direction R8; a taking-off arm rotating means 172, e.g., a known pneumatic rotary actuator 173, for rotating the pair of taking-off arms 171; a reciprocating means 176 attached to a supporting frame 175 for supporting a horizontally movable base 174 movably in the direction D and a direction E, the rotary actuator 173 being attached to the horizontally movable base 174; and a stick support releasing means 178 for releasing the support of the stick 4 by the taking-off arms 171.

The pair of taking-off arms 171 are respectively secured to a pair of rotating shaft members 180 connected to an output rotating shaft 173A of the rotary actuator 173.

The reciprocating means 176 consists of a pair of known pneumatic rodless cylinders 177 each having a cylinder tube 177A, a body 177B, and a piston 177C reciprocatable in the direction D and the direction E.

The stick support releasing means 178 is disposed above the stick juxtaposing and supporting means 100, is attached to the supporting frame 175, and has a pair of inclined members 179 which are respectively inclined toward a pair of endless chains 182 and 183.

While the swivel body 124 is at a standstill, the stick taking-off means 90 causes the pair of taking-off arms 171 to rotate in the direction R8 at a standby position I. As a result of this rotation, the end portions 6 and 7 are respectively received by the pair of taking-off arms 171, and the taking-off arms 171 reach a stop position II. Subsequently, the rodless cylinder 177 is actuated to move the horizontally movable base 174 at a standby position III to a stop position IV in the direction D. As shown in FIGS. 22 and 23, the stick taking-off means 90 thus moves the pair of taking-off arms 171 in a direction (direction D) substantially perpendicular to a taken-off stick 4-4 on the taking-off arms 171, and takes off the stick 4 from the swiveling means 80.

Subsequently, as shown in FIG. 23, the rotary actuator 173 is reversely actuated to cause the stick 4-4 on the taking-off arms 171 rotating reversely in the direction R8 to abut against the inclined members 179, thereby releasing the support of the stick 4-4 by the taking-off arms 171 and rotating the taking-off arms 171 to the standby position I. Subsequently, the rodless cylinder 177 is reversely actuated to move the horizontally movable base 174 to the standby position III in the direction D.

As shown in FIG. 23, the stick 4-4 slips down from the inclined members 179. A placing position V where the stick 4-4 is placed is located at a predetermined distance L2 from the stick supporting members 125 and 126 so that the sausage 2 suspended from the placed stick 4-4 and the sausage 2 suspended from the stick 4-3 which subsequently arrives after being swiveled do not come into contact with each other. The stick support releasing means 178 enhances the positional accuracy of the placing of the stick 4-4 on the endless chains 182 and 183. Since the stick taking-off means 90 actuates the taking-off arms 171 by rotating, the structure and operation are simple.

The plurality of sticks 4 juxtaposed and accumulated on the stick juxtaposing and supporting means 100 in parallel are conveyed for providing heat treatment in the direction D as the endless chains 182 and 183 travel. The stick juxtaposing and supporting means 100 in this example is constituted by a conveyor 101, but may be a placing table 102 for merely juxtaposing and supporting the sticks 4 without conveying the sticks 4. The sticks 4 maybe transferred from the placing table 102 onto a smoking truck 192 by a robot or manually.

Figure 13:
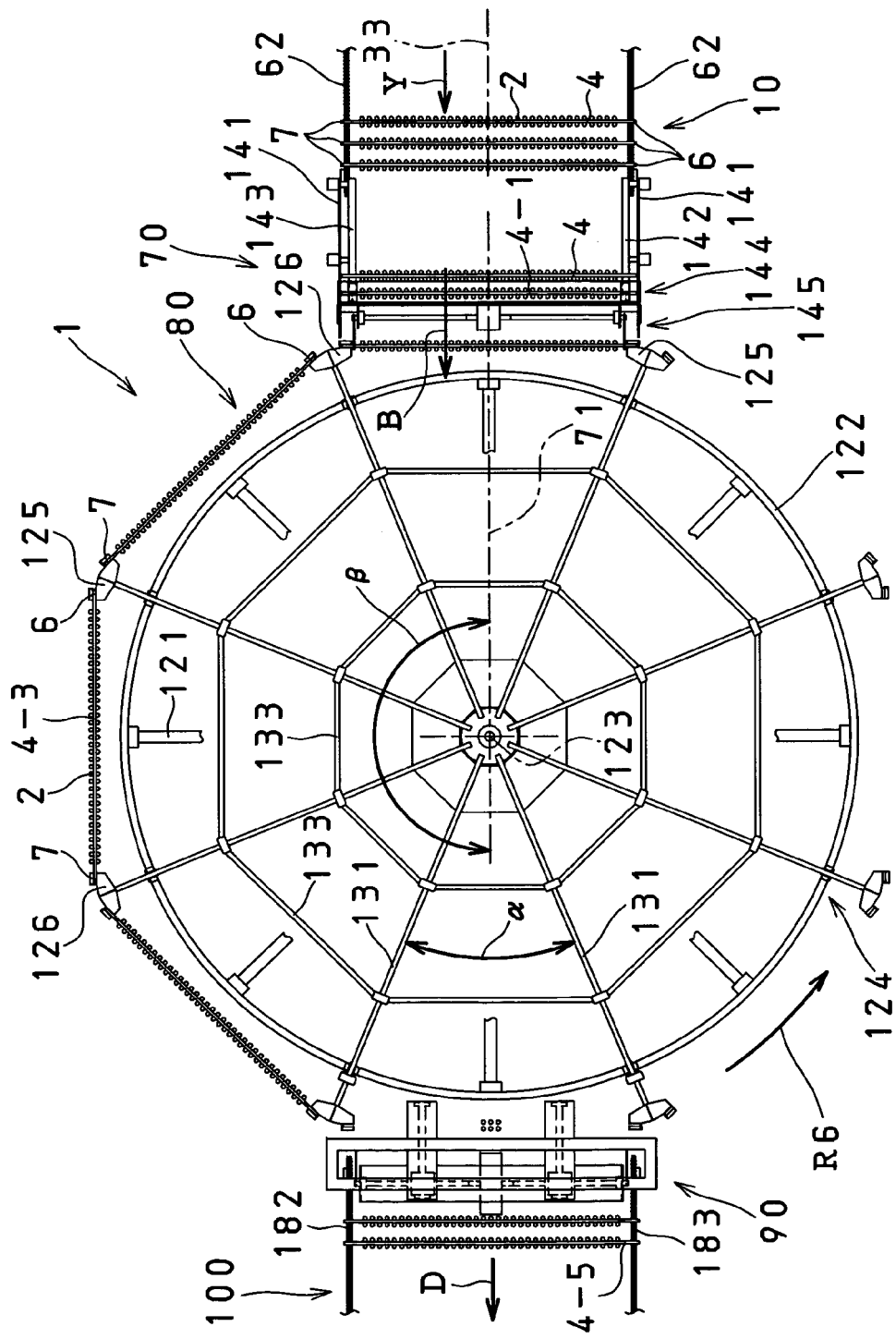
FIG. 13 is a partially enlarged plan view of the embodiment shown in FIG. 1.
Figure 14:
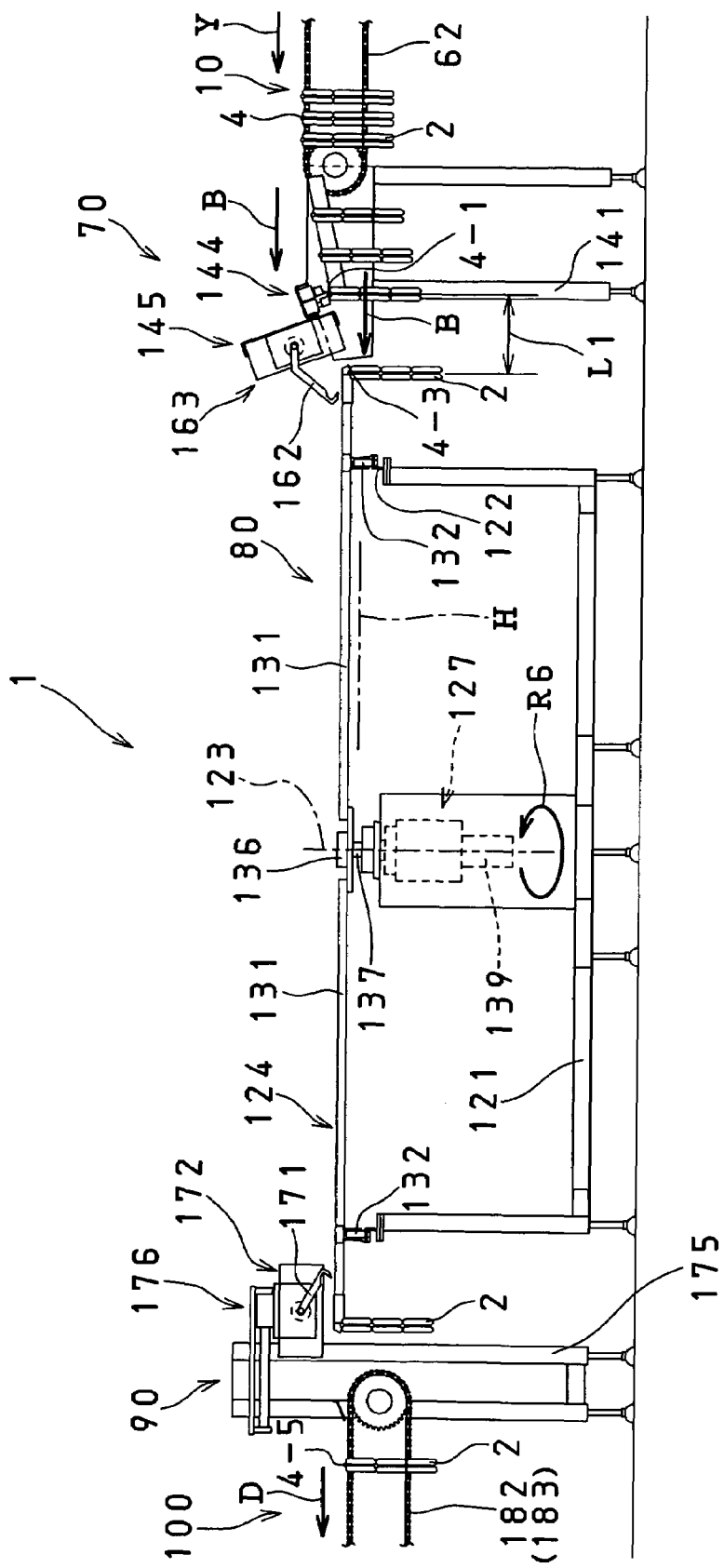
FIG. 14 is a front elevational view of the embodiment shown in FIG. 13.

With the above-described transferring apparatus 1, as shown in FIG. 13, in the swiveling means 80 interposed between the conveying means 10 and the stick juxtaposing and supporting means 100, the sticks 4 with the sausage 2 suspended therefrom are transferred in series, i.e., the sticks 4 are transferred linearly such that the other end portion 7 of the following stick 4 is opposed to the one end portion 6 of the preceding stick 4. Therefore, it is possible to easily perform the inspection and correction operation with respect to the sausage 2 suspended from the stick 4. Furthermore, since the stick 4 is transferred while the end portions 6 and 7 of the stick 4 are being supported, the transferring apparatus 1 makes it possible to suspend a greater number of loops of the sausage 2 from the stick 4.

Figure 24:
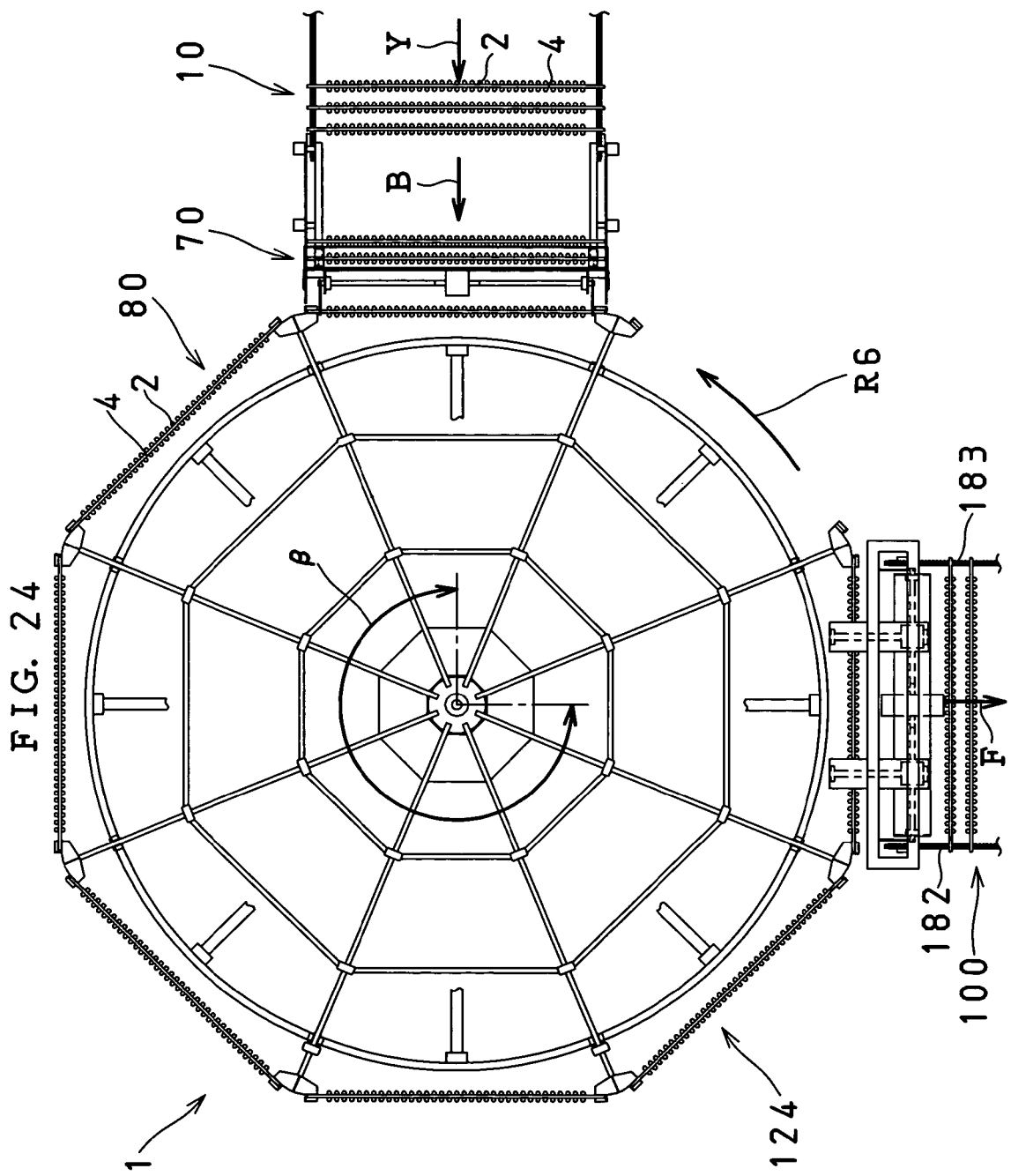
FIG. 24 is a plan view of another preferred embodiment of the invention.

As shown in FIG. 24, an arrangement may be provided such that the sticks 4 which have been swiveled by the stick transferring angle β=270 degrees are juxtaposed in parallel on the stick juxtaposing and supporting means 100. In this case, the sticks 4 are conveyed by the stick juxtaposing and supporting means 100 in a direction F. Thus, in accordance with the transferring apparatus 1, the stick transferring angle β can be set to a desired value.

Figure 25:
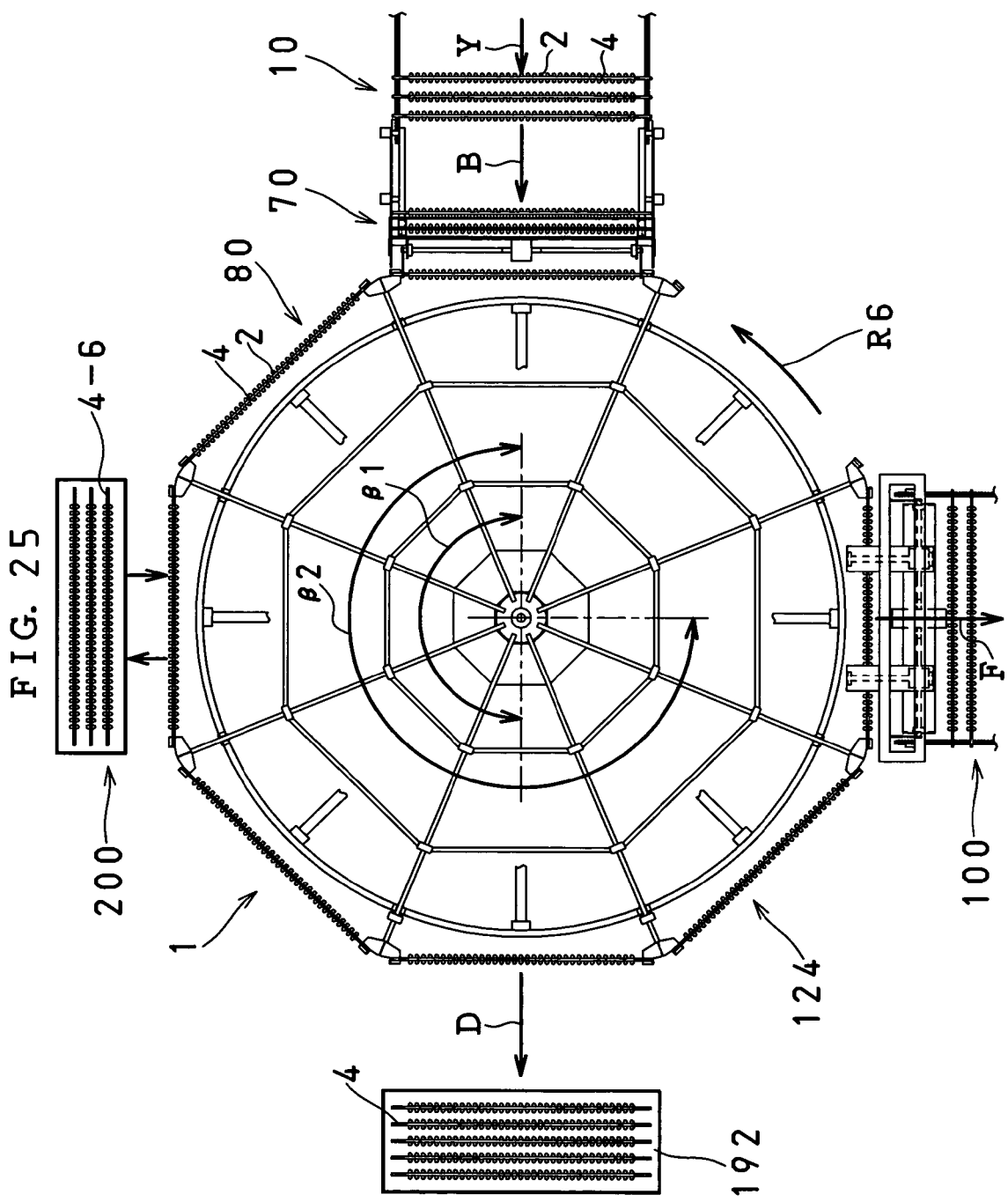
FIG. 25 is a plan view of still another preferred embodiment of the invention.

In the transferring apparatus 1 shown in FIG. 25, the smoking truck 192 and a buffer means 200 are disposed between the stick delivering means 70 and the stick juxtaposing and supporting means 100 which are shown in FIG. 2. After being swiveled by a stick transferring angle β1 or a stick transferring angle β2, the stick 4 is taken off from the swiveling means 80 in the direction D or the direction F. Since two stations are provided for taking off the sticks, it is easily possible to cope with the transfer of the sticks 4 to different ensuing processes.

The buffer means 200 is for temporarily storing removed sticks 4-6 at a side of the swiveling means 80 after the sticks 4 placed on the swiveling means 80 being swiveled are removed from the swiveling means 80. It is thereby possible to take off the sticks 4 after adjusting the number of the sticks 4. The buffer means 200 makes it possible to supply again the temporarily stored sticks 4-6 to the swiveling means 80, as required.

Figure 26:
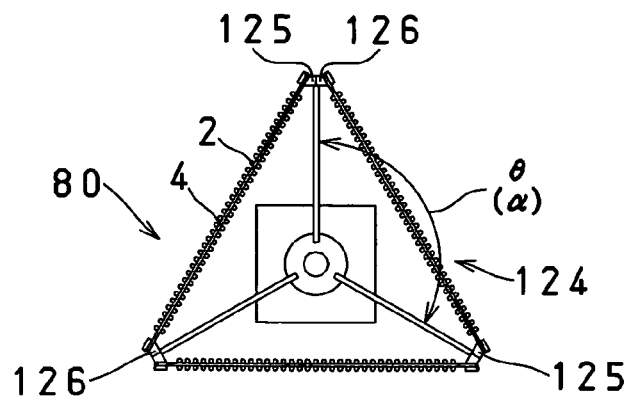
FIG. 26 is a plan view illustrating mainly another swiveling means in accordance with the invention.
Figure 27:
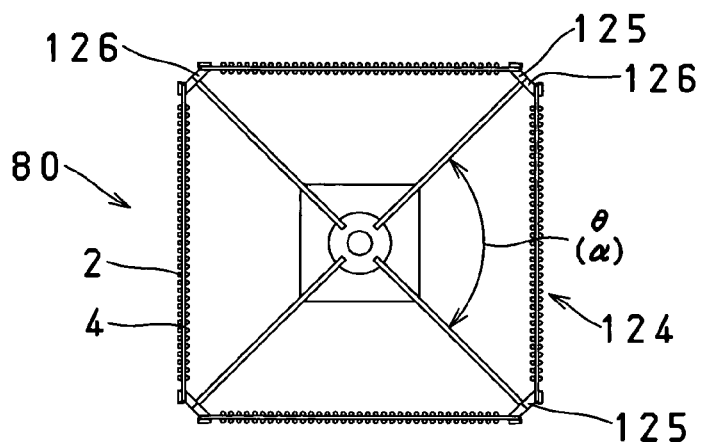
FIG. 27 is a plan view illustrating mainly still another swiveling means in accordance with the invention.
Figure 28:
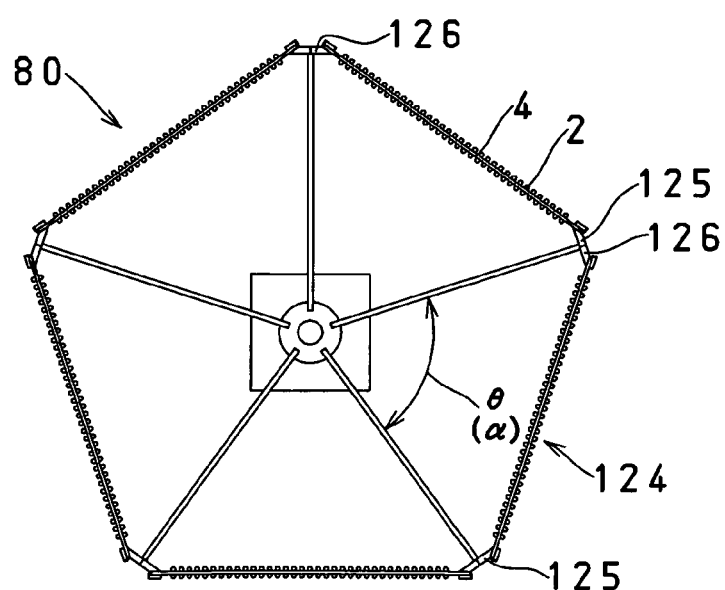
FIG. 28 is a plan view illustrating mainly a further swiveling means in accordance with the invention.
Figure 29:
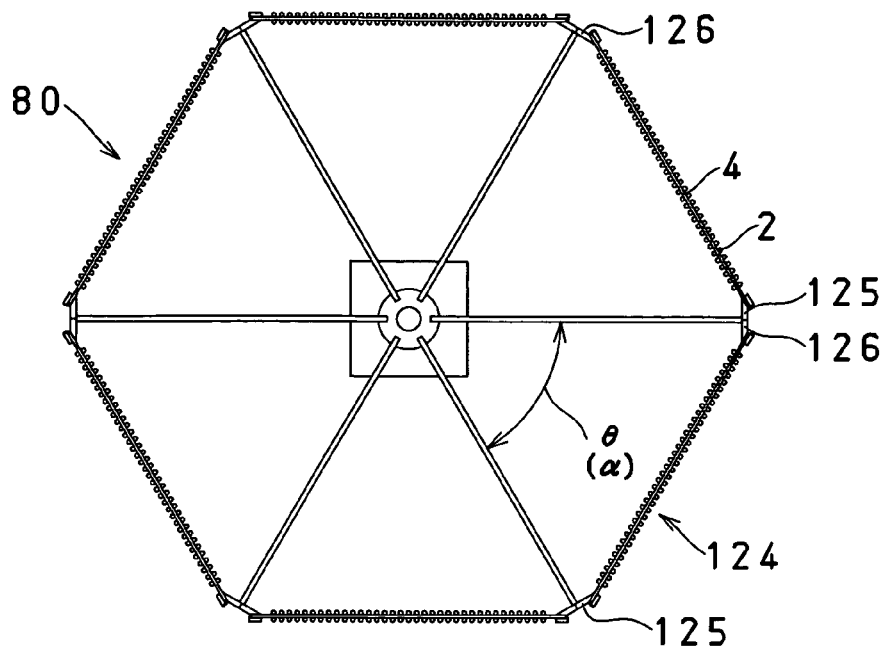
FIG. 29 is a plan view illustrating mainly a still further swiveling means in accordance with the invention.
Figure 30:
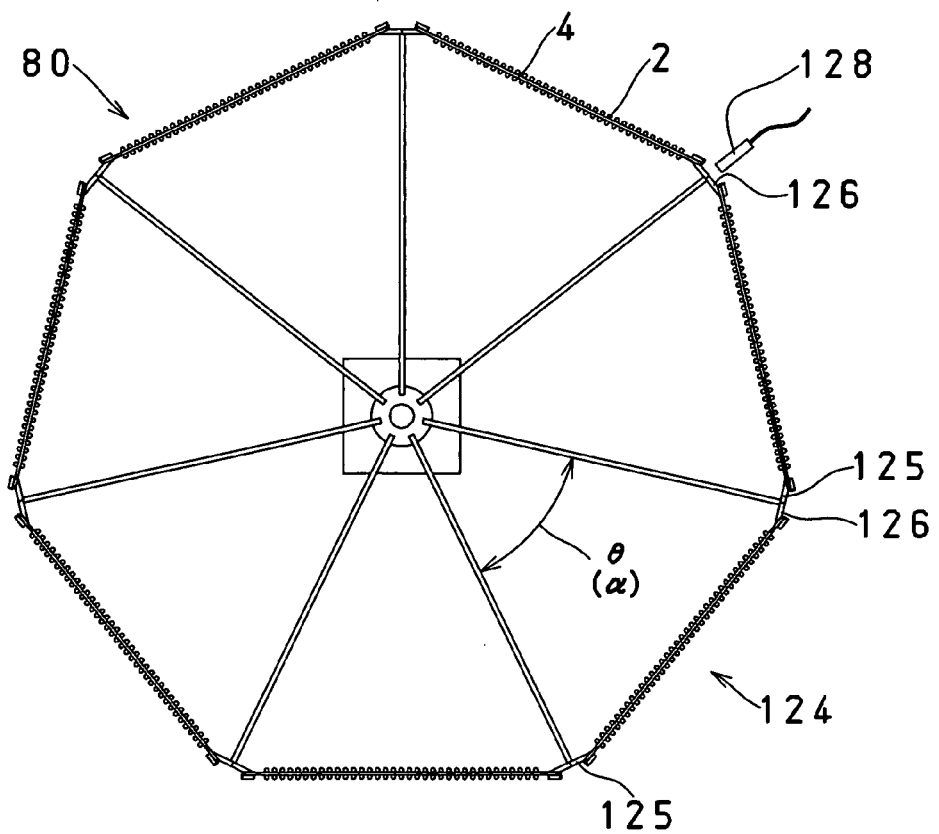
FIG. 30 is a plan view illustrating mainly a further swiveling means in accordance with the invention.
Figure 31:
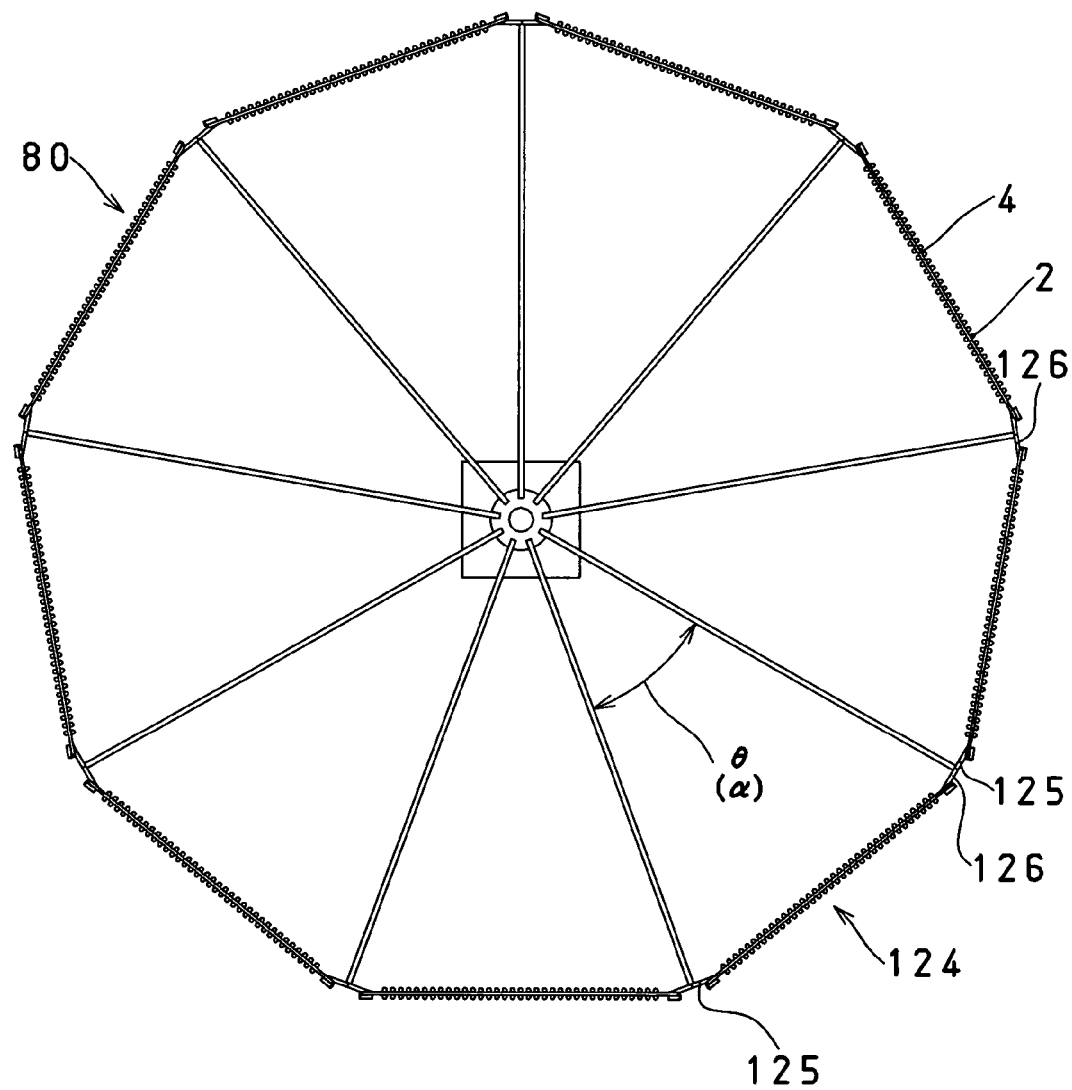
FIG. 31 is a plan view illustrating mainly a further swiveling means in accordance with the invention.

As shown in FIGS. 26 to 31, the number of pairs of stick supporting members 125 and 126 provided in the swiveling means 80 is not limited to 8. FIG. 26 shows the swiveling means 80 having 3 pairs of stick supporting members with the angle θ of a circular arc (the stick arrangement angle α)=120 degrees. FIG. 27 shows the swiveling means 80 having 4 pairs of stick supporting members with the angle θ of a circular arc=90 degrees. FIG. 28 shows the swiveling means 80 having 5 pairs of stick supporting members with the angle θ of a circular arc=72 degrees. FIG. 29 shows the swiveling means 80 having 6 pairs of stick supporting members with the angle θ of a circular arc=60 degrees. FIG. 30 shows the swiveling means 80 having 7 pairs of stick supporting members with the angle θ of a circular arc≅51.4 degrees. This swiveling means 80 in FIG. 30 has a sensor 128 for detecting a position of the stick supporting members 125 and 126. FIG. 31 shows the swiveling means 80 having 9 pairs of stick supporting members with the angle θ of a circular arc=40 degrees. In this way, the swiveling means 80 can be appropriately set by taking into consideration the space for the inspection and correction operation of the sausage 2 and the station for taking off the stick 4.

It should be noted that to clearly show differences in the structure of the swiveling means 80 due to the difference in the number of pairs of the stick supporting members 125 and 126, FIGS. 26 to 31 show states in which the sticks 4 with the respective sausages suspended therefrom are placed on all the stick supporting members 125 and 126. In this way, the swiveling means 80 of the invention is capable of arranging the plurality of sticks 4 in a polygonal shape.

Figure 32:
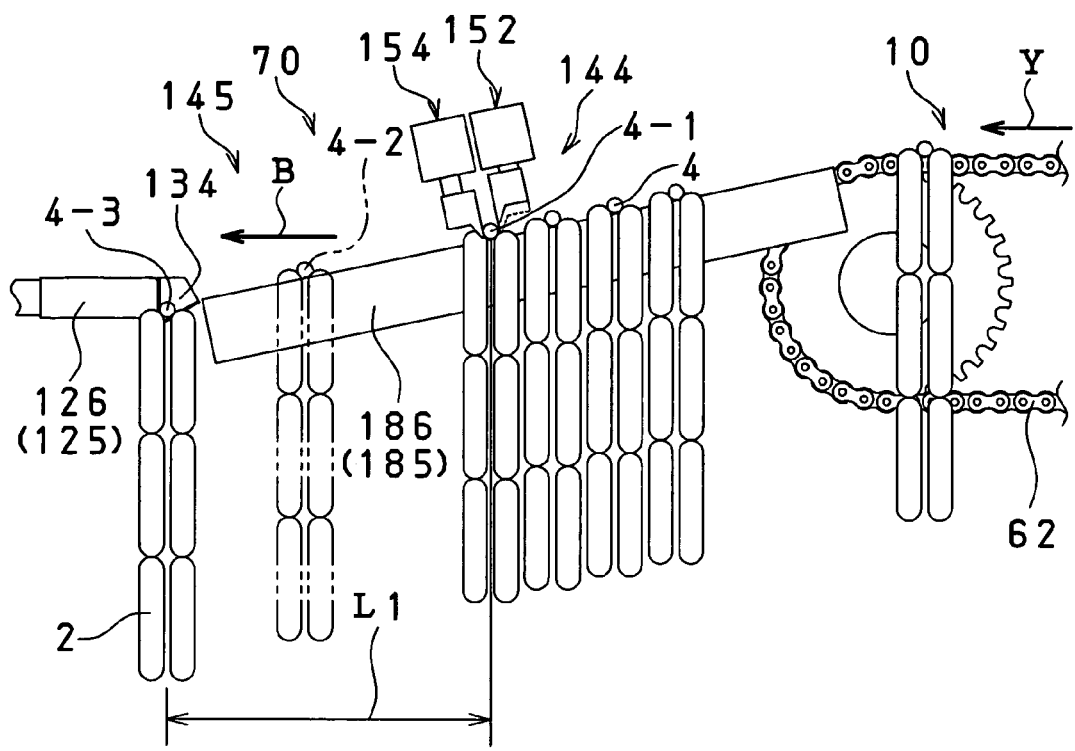
FIG. 32 is a front elevational view illustrating mainly another stick delivering means in accordance with the invention.

FIG. 32 shows the stick delivering means 70 in accordance with another example. In this stick delivering means 70, the stick separating means 144 and the separated stick moving means 145 jointly use a pair of chutes 185 and 186. One separated stick 4-2 slips down on the chutes 185 and 186 and is transferred onto the recesses 134.

Figure 33:
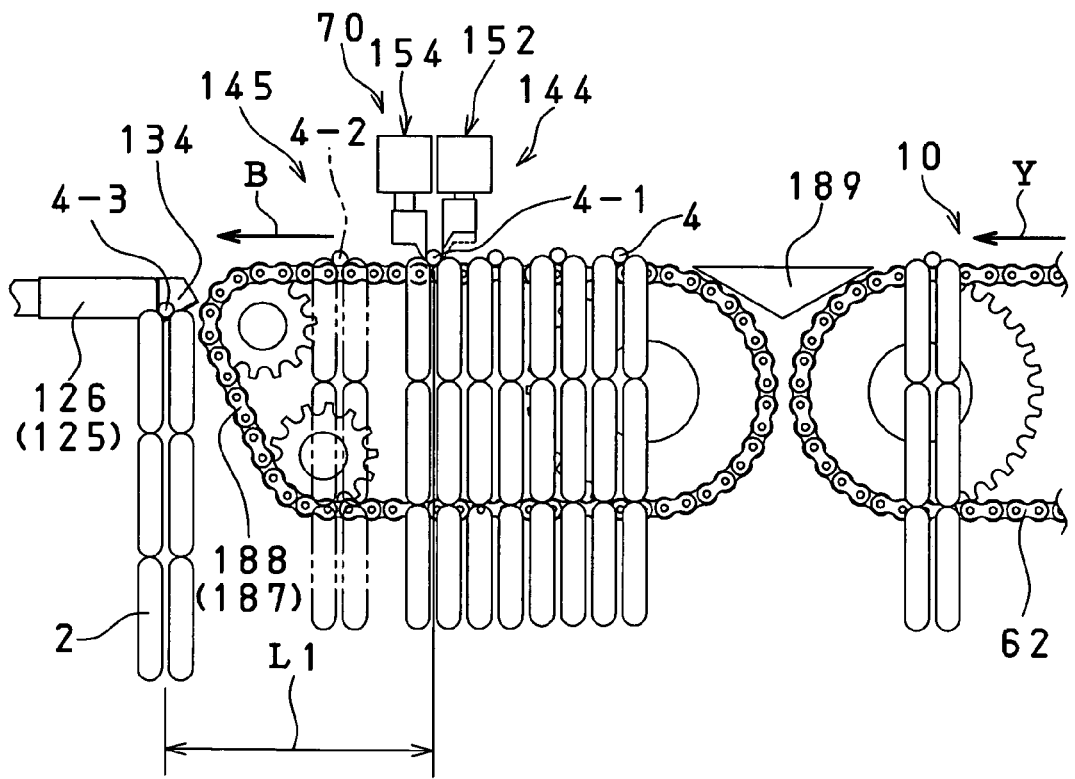
FIG. 33 is a front elevational view illustrating mainly still another stick delivering means in accordance with the invention.
Figure 35A:
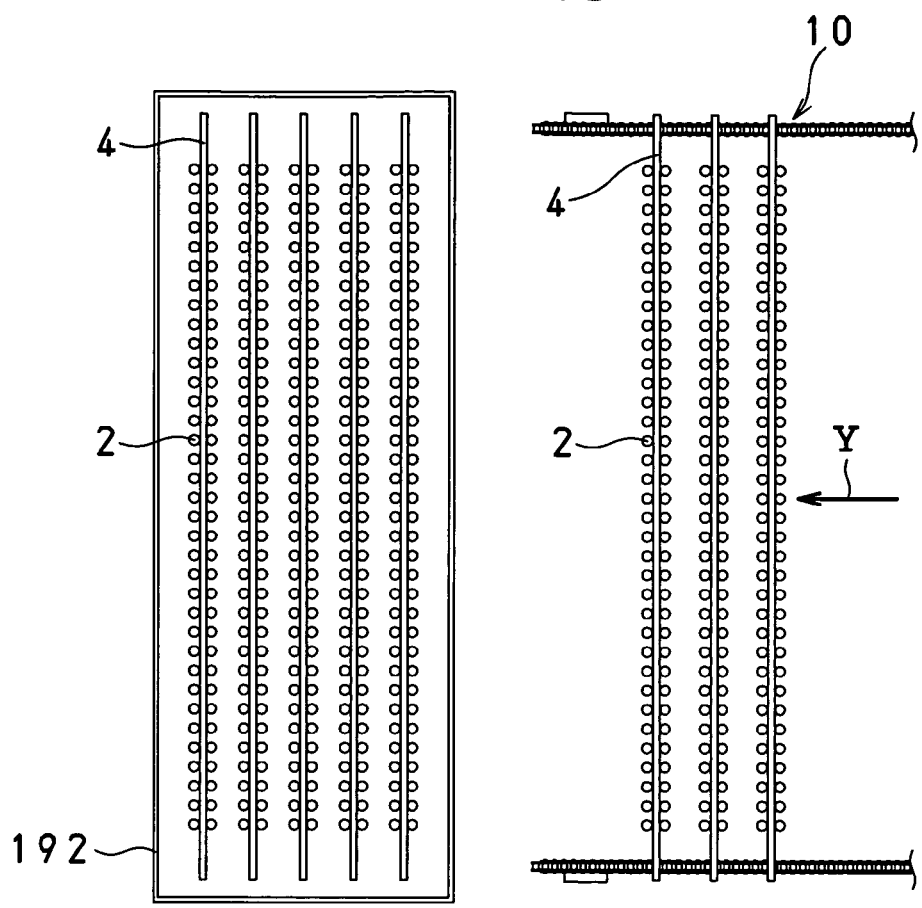
FIG. 35A is a schematic plan view explaining the background art of the invention.
Figure 35B:
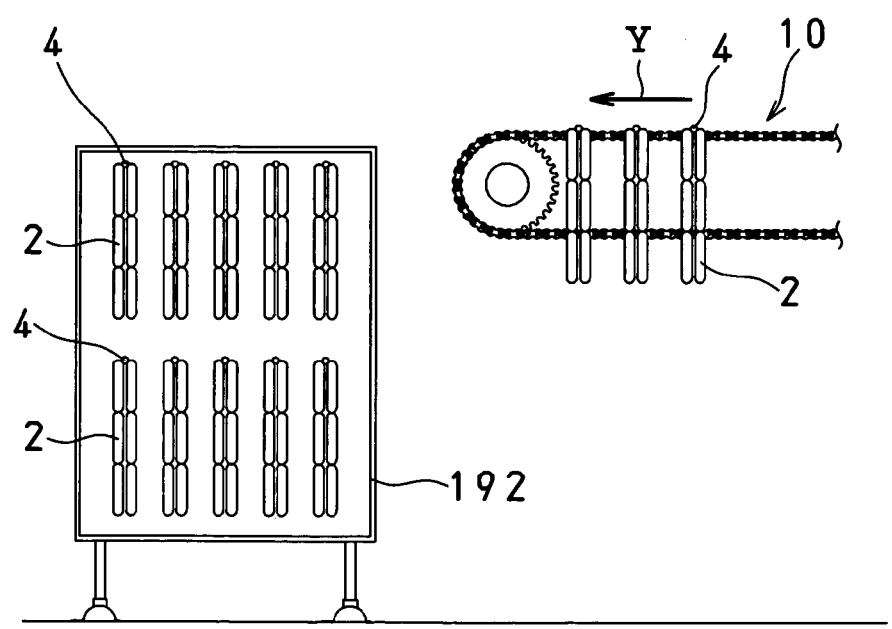
FIG. 35B is a schematic front elevational view of FIG. 35A.

FIG. 33 shows the stick delivering means 70 in accordance with still another example. In this stick delivering means 70, the stick separating means 144 and the separated stick moving means 145 jointly use a pair of delivering endless chains 187 and 188. One separated stick 4 is conveyed and is moved the predetermined distance L1.

An arrangement may be provided such that by removing the pair of delivering endless chains 187 and 188 and a bridge 189, the pair of conveying endless chains 62 of the conveying means 10 are extended to the stick delivering means 70, so as to allow the stick separating means 144 and the separated stick moving means 145 to jointly use the pair of conveying endless chains 62.

As the transferring apparatus 1 shown in FIG. 34, the sticks 4 taken off from the swiveling means 80 can be juxtaposed in series on a stick juxtaposing and supporting means 300 which has a pair of attachments 195 and 196 fixed to the pair of endless chains 193 and 194 in correspondence with the length l1 of the stick 4.

Instead of the intermittent driving by the electric motor 139, the swivel body driving means 127 may intermittently drive the swivel body 124 by an intermittently indexing device using a cam mechanism, for example. The stick separating means 144, the delivery arm rotating means 163, the taking-off arm rotating means 172, and the reciprocating means 176 are not limited to those using air as driving sources, and it is possible to use other known means including electric motors/electric actuators, hydraulic motors/hydraulic actuators, or the like.

What is claimed is:

1. An apparatus for transferring a stick with a food product such as a sausage suspended therefrom, comprising:

stick supporting and relaying means disposed along a plurality of suspending hooks for suspending the food product such as the sausage, for being supplied with and supporting thereon a stick from which the food product transferred from the suspending hooks is suspended;

stick removing and supporting means having a pair of movable members for removing from said stick supporting and relaying means at a position opposed to said stick supporting and relaying means a stick which is supported at both end portions thereof by said stick supporting and relaying means and from which the sausage or the like is suspended, and for supporting the stick at the both end portions;

moving means for moving said stick removing and supporting means while maintaining a direction substantially parallel to a longitudinal axis of the stick extending when the stick was supported at the both end portions by said stick supporting and relaying means, so as to transfer in a direction of the longitudinal axis of the stick the stick which is supported at the both end portions by said stick removing and supporting means to a predetermined position above conveying means located at a predetermined distance in the direction of the longitudinal axis of the stick from a position opposed to said stick supporting and relaying means;

said conveying means including conveying wrapping connector means traveling in a direction intersecting a moving direction of said moving means and for conveying a plurality of sticks placed on said conveying wrapping connector means; and lowering means for lowering the stick toward said conveying means so as to deliver to said conveying means the stick which has reached the predetermined position, wherein said stick removing and supporting means is configured to reciprocate together with said moving means between the position opposed to said stick supporting and relaying means and the predetermined position above said conveying means while maintaining the direction substantially parallel to the longitudinal axis of the stick extending when the stick was supported at the both end portions by said stick supporting and relaying means.

2. The apparatus for transferring a stick with a food product such as a sausage suspended therefrom according to claim 1, wherein said lowering means is disposed stationarily at the predetermined position in a reciprocating direction of said moving means, and said stick removing and supporting means delivers the stick to said lowering means as said movable members are actuated at the predetermined position to release the stick supported by said movable members.

3. The apparatus for transferring a stick with a food product such as a sausage suspended therefrom according to claim 1, wherein each of said movable members of said stick removing and supporting means is constituted by a rotatable transfer hook for supporting an end portion of the stick, and said stick removing and supporting means further has movable member actuating means including transfer hook rotating means for rotating said transfer hook, said transfer hook being rotatable in a plane substantially perpendicular to the longitudinal axis of the stick extending when the stick was supported at the both end portions by said stick supporting and relaying means.

4. The apparatus for transferring a stick with a food product such as a sausage suspended therefrom according to claim 1, further comprising: swiveling means including a swiveling axis, a pair of stick supporting members for supporting a stick with a food product such as a sausage suspended therefrom, said pair of stick supporting members being disposed at positions spaced apart a swivel radius from the swiveling axis, and a swivel body on which a plurality of said pairs of stick supporting members are provided about the swiveling axis so as to be capable of arranging a plurality of sticks in a polygonal shape.

5. The apparatus for transferring a stick with a food product such as a sausage suspended therefrom according to claim 1, wherein said lowering means is provided on said moving means so as to reciprocate together with said moving means between the position opposed to said stick supporting and relaying means and the predetermined position, and said stick removing and supporting means is provided on said lowering means and is adapted to be lowered together with said lowering means toward said conveying means at the predetermined position and deliver the stick to said conveying means as said movable members are actuated to release the stick supported by said movable members.

6. The apparatus for transferring a stick with a food product such as a sausage suspended therefrom according to claim 1, wherein said stick supporting and relaying means includes a pair of stick receivers, one for supporting one end of the stick and the other for supporting the other end of the stick; a relay arm to which said one stick receiver is attached; and relay arm rotating means for rotating said relay arm in a plane substantially perpendicular to the longitudinal axis of the stick extending when the stick was supported at the both end portions by said stick supporting and relaying means, so as to allow said one stick receiver to retreat from a path of transfer of the stick headed toward the predetermined position.

7. An apparatus for transferring a stick with a food product such as a sausage suspended therefrom, comprising:

stick supporting and relaying means disposed along a plurality of suspending hooks for suspending a food product such as a sausage, for being supplied with and supporting thereon a stick from which the food product transferred from the suspending hooks is suspended;

moving means for moving to a predetermined position above conveying means located at a predetermined distance in a direction of a longitudinal axis of the stick from a position opposed to said stick supporting and relaying means, while maintaining a direction substantially parallel to the longitudinal axis of the stick extending when the stick was supported at both end portions thereof by said stick supporting and relaying means, so as to transfer in a direction of the longitudinal axis of the stick the stick which is supported at the both end portions;

said conveying means including conveying wrapping connector means traveling in a direction intersecting a moving direction of said moving means and for conveying a plurality of sticks placed on said conveying wrapping connector means; and lowering means for lowering the stick toward said conveying means so as to deliver to said conveying means the stick which has reached the predetermined position, wherein said moving means is configured to reciprocate between the position opposed to said stick supporting and relaying means and the predetermined position above said conveying means while maintaining the direction substantially parallel to the longitudinal axis of the stick extending when the stick was supported at the both end portions by said stick supporting and relaying means, in a cycle different from a cycle of supplying the stick to said stick supporting and relaying means.

* * * * *